US012256197B2

(12) United States Patent
Behrens et al.

(10) Patent No.: US 12,256,197 B2
(45) Date of Patent: *Mar. 18, 2025

(54) HEARING DEVICE COMPRISING AN INPUT TRANSDUCER IN THE EAR

(71) Applicant: Oticon A/S, Smørum (DK)

(72) Inventors: Thomas Behrens, Smørum (DK); Michael Syskind Pedersen, Smørum (DK); Meng Guo, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,519

(22) Filed: Nov. 1, 2023

(65) Prior Publication Data

US 2024/0064476 A1 Feb. 22, 2024

Related U.S. Application Data

(63) Continuation of application No. 17/731,700, filed on Apr. 28, 2022, now Pat. No. 11,843,917.

(30) Foreign Application Priority Data

Apr. 29, 2021 (EP) .................................... 21171078

(51) Int. Cl.
*H04R 25/00* (2006.01)

(52) U.S. Cl.
CPC ......... *H04R 25/407* (2013.01); *H04R 25/453* (2013.01)

(58) Field of Classification Search
CPC ..... H04R 25/00; H04R 25/407; H04R 25/453
See application file for complete search history.

(56) References Cited

U.S. PATENT DOCUMENTS 11,843,917 B2 * 12/2023 Behrens ............... H04R 25/407
2007/0009122 A1 1/2007 Hamacher
(Continued)

FOREIGN PATENT DOCUMENTS

EP 2 262 285 A1 12/2010
EP 2 947 898 A1 11/2015
EP 3 506 658 A1 7/2019

OTHER PUBLICATIONS

European Search Report issued in priority application No. 21171078.5 dated Oct. 19, 2021.
(Continued)

*Primary Examiner* — Suhan Ni
(74) *Attorney, Agent, or Firm* — Birch, Stewart, Kolasch & Birch, LLP

(57) ABSTRACT

A hearing aid includes a forward path for processing sound from the user's environment. The forward path includes a) a first microphone providing a first electric input signal representing sound as received at the first microphone, the first microphone being located away from an ear canal of the user, b) an audio signal processor for processing the first electric input signal, or a signal or signals originating therefrom, and for providing a processed signal, c) an output transducer for providing stimuli perceivable as sound to the user in dependence of the processed signal, and d) a second microphone configured to provide a second electric input signal representing sound received at the second microphone, the second microphone being located at or in the user's ear canal, and e) a feature extractor for extracting acoustic characteristics of the user's ear from the second electric input signal, or a signal originating therefrom.

9 Claims, 12 Drawing Sheets

(56) References Cited

U.S. PATENT DOCUMENTS

| | | | |
|---|---|---|---|
| 2010/0020995 | A1 | 1/2010 | Elmedyb et al. |
| 2014/0348360 | A1 | 11/2014 | Gran |
| 2015/0289063 | A1 | 10/2015 | Ma |
| 2015/0341730 | A1 | 11/2015 | Pedersen et al. |
| 2017/0295436 | A1 | 10/2017 | Pedersen et al. |

OTHER PUBLICATIONS

Extended European Search Report for European Application No. 22167774.3, dated Sep. 23, 2022.
European Communication pursuant to Article 94(3) EPC for European Application No. 22 167 774.3, dated Nov. 6, 2024.

* cited by examiner

HEARING DEVICE COMPRISING AN INPUT TRANSDUCER IN THE EAR

This application is a Continuation of copending application Ser. No. 17/731,700, filed on Apr. 28, 2022, which claims priority under 35 U.S.C. § 119 (a) to Application No. 21171078.5, filed in Europe on Apr. 29, 2021, all of which are hereby expressly incorporated by reference into the present application.

TECHNICAL FIELD

The present disclosure deals with hearing devices, e.g. hearing aids or headsets adapted to be worn at or in an ear of a user. The present disclosure deals in particular with a scheme for preserving Pinna cues in the signal presented to the user as picked up by an input transducer located in an ear canal of the user.

In IIC (Invisible-In-Canal) and CIC (Completely-In-Canal) style hearing devices it is currently not possible to do traditional beamforming, since there is typically only one microphone in such devices. Binaural beamforming has been suggested, but it comes with some of the latency problems and loss of cues that binaural beamformers are known to lead to.

In BTE (Behind-The-Ear) and RITE (Receiver-in-The-Ear) style hearing devices, beamformers can allow an amplification larger than possible in IIC and CIC style hearing devices (before feedback is a problem), making them suitable for use by persons having a bigger hearing loss. They can also create a pinna model, which provides directional listening information to the listener in all listening situations (cf. e.g. US20170295436A1). However, there are limitations to these BTE/RITE pinna models in that they only provide 2D information from the horizontal plane, whereas the Pinna provides 3D location information and the accuracy of current 2D models is to some extent of a lesser quality than similar pinna location information. Experiments (cf. e.g. [Roffler & Butler; 1968]) have shown that high frequency pinna cues are necessary in order to accurately localize sounds in the vertical plane.

EP2262285A1 deals with a hearing aid comprising a directionality system for providing a weighted sum of at least two microphone signals thereby providing at least two directional microphone signals having maximum sensitivity in spatially different directions and a combined microphone signal, and a frequency shaping-unit for modifying the combined microphone signal to indicate directional cues of input sounds originating from at least one of said spatially different directions and providing an improved directional output signal.

SUMMARY

The present disclosure combines the strengths of CIC and BTE/miniRITE hearing devices. It takes the Pinna cues from the CIC device (placed ideally at the anatomical ear canal opening) and combines with the beamforming and higher amplification levels of the BTE/mintRITE style hearing devices.

The present disclosure solves the problem of providing sufficient amplification for a wide range of people with hearing loss, while still maintaining the Pinna cues.

Sound can be decomposed into an envelope and fine structure, which can be modified independently before being combined again into a final output signal.

The sound picked up by a microphone located in the ear canal (as in a CIC or IIC-style hearing device) is not used for amplification—only the envelope of the incoming sound is used and combined with the fine structure of an "enhanced omnidirectional" sound from microphones in a RITE/BTE-type hearing device. This combination can be done in several ways—either mathematically, following the inverse of the decomposition into envelope and phase, or it can be applied after beamforming, e.g. using a post filter.

In this way the amplified output of the hearing device is more resembling the "BTE/RITE sound" than "the CIC sound" and therefore more amplification can be applied with less risk for feedback. At the same time, the sound from the BTE/RITE is enriched by the pinna cues from the CIC microphone position.

The application of the extracted pinna cues to the first electric input signal (or to a signal derived therefrom) may be made dependent on feedback estimate(s) provided by a feedback estimator, or it may be made dependent on the selection of a specific mode of operation (e.g. a specific hearing aid program), e.g. selected from a user interface.

A Hearing Aid:

In an aspect of the present application, a hearing aid configured to be worn at, and/or in, an ear of a user is provided. The hearing aid comprises a forward path for processing sound from the environment of the user. The forward path comprises

- at least one first microphone providing at least one first electric input signal representing said sound as received at the respective at least one first microphones, said at least one first microphone being located away from a first ear canal of the user,
- an audio signal processor for processing said at least one first electric input signal, or a signal or signals originating therefrom, and for providing a processed signal,
- an output transducer for providing stimuli perceivable as sound to the user in dependence of said processed signal.

The hearing aid may further comprise at least one second microphone connected to said audio signal processor, the at least one second microphone being configured to provide at least one second electric input signal representing said sound as received at the at least one second microphone, the at least one second microphone being located at or in said first ear canal of the user. The hearing aid may further comprise that a feature extractor for extracting acoustic characteristics of said ear of the user from said at least one second electric input signal, or a signal originating therefrom. The hearing aid may be configured to include said acoustic characteristics in the processed signal.

Thereby an improved hearing aid may be provided.

The acoustic characteristics of said ear, also termed 'pinna cues' are dominated by phase modifications of the acoustic signal impinging on the ear (pinna) at relatively low frequencies (below a LF-HF-threshold frequency, $f_{LF\text{-}HF}$) and are dominated by amplitude modifications at relatively high frequencies (above the LF-HF-threshold frequency, $f_{LF\text{-}HF}$). The border frequency between low and high frequencies may in the present context be larger than 1 kHz, e.g. in the range between 1 kHz and 4 kHz, e.g. around 2 kHz. The threshold frequency may be different for different persons (ears).

The feature extractor for extracting acoustic characteristics of an ear of the user may e.g. be configured to extract acoustic characteristics as magnitude and phase properties (the combination of both can be represented as a complex value).

The feature extractor for extracting acoustic characteristics of an ear of the user may e.g. be configured to focus on phase properties of the acoustic characteristics in a first frequency range. The feature extractor for extracting acoustic characteristics of an ear of the user may e.g. be configured to focus on magnitude properties of the acoustic characteristics in a second frequency range. The feature extractor for extracting acoustic characteristics of an ear of the user may e.g. be configured to focus on phase properties of the acoustic characteristics below a LF-HF-threshold frequency ($f_{LF-HF}$) and to focus on magnitude properties of the acoustic characteristics above the LF-HF-threshold frequency. The feature extractor for extracting acoustic characteristics of an ear of the user may e.g. be configured to include magnitude and phase properties of the acoustic characteristics below a LF-HF-threshold frequency ($f_{LF-HF}$) and to focus on magnitude properties of the acoustic characteristics above the LF-HF-threshold frequency. The LF-HF-threshold frequency ($f_{LF-HF}$) may e.g. be below 2.5 kHz, such as below 2 kHz, such as in a range between 1 kHz and 2 kHz.

Considering the phase of the acoustic characteristics ('pinna cues') (as opposed to only its magnitude) may provide more precise pinna model, in particular in a frequency range below 2 kHz.

Since a person's hearing loss typically increases with frequency, it is advantageous for a hearing impaired person that the pinna model is as precise as possible in the frequencies where the hearing loss is relatively smaller (lower frequencies).

The hearing aid may comprise only one second microphone.

The hearing aid may comprise only one first microphone.

The (or at least one of the) at least one first microphones may be located in the contralateral ear canal or at the contralateral ear, and the at least one second microphone may be located in the ipsilateral ear canal.

The feature extractor may comprise an envelope extractor for extracting said acoustic characteristics, the envelope extractor being configured to determine an envelope and/or envelope cues of the at least one second electric input signal, or a signal originating therefrom, and to provide an envelope signal representative thereof. The audio signal processor may be configured to include said acoustic characteristics in the processed signal in dependence of the envelope signal.

The term "envelope" is in the present context taken to mean "a smoothing curve outlining the extremes of a signal".

The fine structure may as well be extracted by the Hilbert transform, referred to as the Hilbert fine structure. Phase modifications can be applied to the at least one first electric input signals using a complex exponential, e.g. via complex postfilter gains.

The audio signal processor may be configured to apply said envelope or envelope cues to said at least one first electric input signal, or to a signal originating therefrom. The audio signal processor may be configured to substitute a current envelope of the at least one first electric input signal, or a signal originating therefrom, by the current envelope determined for the at least one second electric input signal.

The audio signal processor may be configured to apply said envelope or envelope cues to said at least one first electric input signal, or to a signal originating therefrom, only above an LF-HF-threshold frequency, $f_{LF-HF}$.

The audio signal processor may be configured to apply said envelope or envelope cues to said at least one first electric input signal, or to a signal originating therefrom, only below an LF-HF-threshold frequency, $f_{LF-HF}$.

The hearing aid may comprise at least two first microphones providing respective at least two first electric input signals wherein the audio signal processor comprises a directional system for providing at least one beamformer comprising predefined and/or adaptively updated beamformer weights, and for providing at least one beamformed signal in dependence of said at least two first electric input signals and said at least one beamformer. The processed signal may be provided in dependence of said at least one beamformed signal, or a signal or signals originating therefrom. The audio signal processor may be configured to include the acoustic characteristics extracted from the at least one second electric input signal, or a signal originating therefrom, in the at least one beamformed signal, or a signal or signals originating therefrom.

The hearing aid may comprise a postfilter for filtering said at least one electric input signal or said beamformed signal, or a signal originating therefrom, based on adaptively updated postfilter gains and configured to provide a filtered signal.

The postfilter gains may be complex values (including magnitude and phase).

The postfilter may be configured to determine postfilter gains in dependence of the extracted acoustic characteristics.

The postfilter may be configured to determine the postfilter gains in dependence of the envelope signal. The postfilter may be connected to the envelope extractor and configured to receive the envelope signal. The envelope of the at least one second electric input signal may e.g. be extracted by a standard signal processing procedure, such as low-pass filtering of the (e.g. squared) magnitude of the signal, or by applying the Hilbert transform to the at least one second electric input signal, etc. The envelope cues may e.g. comprise amplitude differences between the different microphone signals. Such amplitude differences may be sound source direction dependent, and thus encode important pinna cues. Application of the envelope cues can be done either by means of the absolute envelope or by means of the envelope difference between (one or more of) the at least one second electric input signal and (one or more of) the at least two first electric input signal.

The feature extractor may be configured to determine said acoustic characteristics of the ear of the user in dependence of a level difference measure indicative of a difference in level between the at least one second electric input signal and the at least one first electric input signal. An estimate of the (level contribution to the) acoustic characteristics of the ear may e.g. be provided by a level difference measure relating to the difference in level between the at least one second electric input signal and the at least one first electric input signal, e.g. $\Delta L = L2 - L1$, where L2 is a current level of a second microphone signal and L1 is a current level of a first microphone signal.

The feature extractor may also be configured to determine said acoustic characteristics of the ear of the user in dependence of a phase difference between the at least one second electric input signal and the at least one first electric input signal. An estimate of the (phase contribution to the) acoustic characteristics of the ear may e.g. be provided by a phase difference measure relating to the difference in phase between the at least one second electric input signal and the at least one first electric input signal, e.g. $\Delta P = P2 - P1$, where P2 is a current phase of a second microphone signal and P1 is a current phase of a first microphone signal.

The postfilter may be configured to determine said postfilter gains in dependence of the level and/or phase difference measures. The postfilter gain (at a given frequency) may increase with increasing level difference measure (e.g. $\Delta L = L2 - L1$). The postfilter gain (at a given frequency) may decrease with decreasing level difference measure (e.g. $\Delta L = L2 - L1$). The postfilter gain (at a given frequency) may be proportional to the level difference measure (e.g. $\Delta L = L2 - L1$). The postfilter gain (at a given frequency) may be a smooth function of the level difference measure. The postfilter gain (at a given frequency) may be represented by a piecewise linear function. The postfilter gain (at a given frequency) may include a cap beyond which the gain does not increase (or decrease) further for increasing (or decreasing) level or phase difference measure (e.g. $\Delta L = L2 - L1$, $\Delta P = P2 - P1$).

The (frequency dependent) envelope (level) differences may be approximated by level differences directly (as the envelope level values can be approximated as smoothed signal levels). Thereby a relatively simple (frequency dependent) envelope difference-to-postfilter gain determination (providing spatial cues to the at least one first electric input signal (or a signal derived therefrom) can be provided.

The audio signal processor may be configured to apply a frequency and/or level dependent gain according to the user's needs to the at least one first electric input signal, or to a signal or signals originating therefrom, and to provide the processed signal in dependence thereof. The audio signal processor may be configured to base the processed signal on the filtered signal from the postfilter. In other words, the audio signal processor may be connected to (or comprise) the postfilter.

The hearing aid may comprise a BTE-part adapted for being located at or behind an ear (pinna) of the user, and wherein the at least one first microphones is located in the BTE-part.

The hearing aid may comprise an ITE-part adapted for being located at or in an ear canal of the user, and wherein the at least one second microphone is located in the ITE-part.

The output transducer may be located in the ITE-part.

The hearing aid may comprise a feedback control system for estimating and/or attenuating feedback from the output transducer to one or more of the at least one first microphones and the at least one second microphone. The feedback control system may comprise a feedback path estimator for providing a feedback estimate representative of feedback from the output transducer to one or more of the at least one second microphone.

The feedback control system may be configured to provide a reliability estimate of the at least one second electric input signal in dependence of the feedback estimate. The reliability estimate may be provided in absolute terms for (one or more of) the at least one second electric input signals. The reliability estimate may be provided as a relative measure, e.g. between (one or more of) the at least one second electric input signal and one or more of the at least one first electric input signal.

In case the feedback estimate(s) from the output transducer to the at least one second microphone is considered to be non-critical, the processed signal of the audio signal processor may be based on (such as exclusively based on) said at least one second electric signal or a signal derived therefrom. In such case the extraction of pinna cues and application to the at least one first electric signal or a signal derived therefrom may be dispensed with.

The application of the extracted pinna cues to the first electric input signal (or to a signal derived therefrom) may be made dependent on feedback estimate(s) provided by a feedback estimator, or it may be made dependent on the selection of a specific mode of operation (e.g. a specific hearing aid program), e.g. selected from a user interface.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology). The wireless link may be based on ultra wide band (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time to (or n), each audio sample representing the value of the acoustic signal at to by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof.

The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the hearing aid or hearing aid system via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

With reference to FIG. 3. the user interface (UI) may implement a Pinna Cue Configuration APP. The screen 'Select configuration of hearing aid system' allows a user to decide how the pinna cue extraction system according to the present disclosure is configured. The auxiliary device and the hearing aid are adapted to allow communication of data representative of the currently selected configuration via a, e.g. wireless, communication link.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
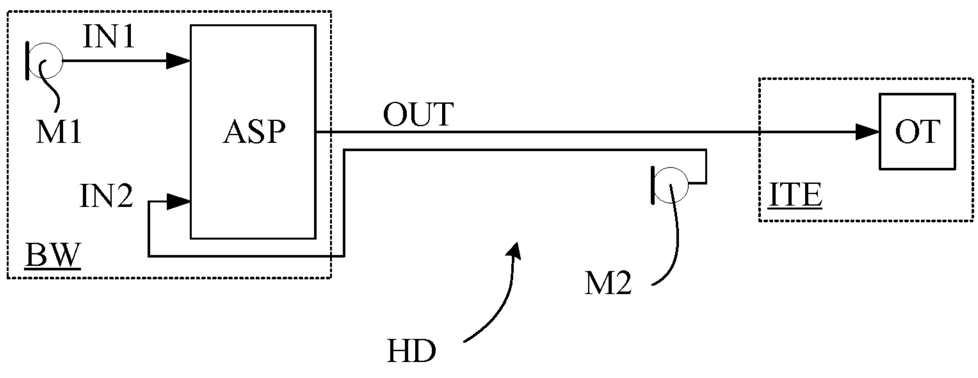
FIG. 1A schematically shows a first embodiment of a hearing aid comprising a body worn-part comprising a microphone and a processor, an ITE-part adapted for being located in an ear canal of the user and comprising an output transducer, and a microphone adapted for being located to pick up acoustic reflections from pinna according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids, adapted to be worn at or in an ear of a user. The present disclosure deals in particular with a scheme for preserving Pinna cues in the signal presented to the user as picked up by an input transducer located in an ear canal of the user.

A hearing device according to the present disclosure solves e.g. the problem of providing sufficient amplification for a wide range of people with hearing loss, while still maintaining the Pinna cues.

Sound can be decomposed into an envelope and fine structure, which can be modified independently before being combined again into a final output signal. An envelope can be extracted using the Hilbert transform or by low-pass filtering the magnitude or the squared magnitude of the signal. The envelope may be extracted for each frequency channel separately.

The sound picked up by a microphone located in the ear canal (as in a CIC or IIC-style hearing device) is not used for amplification—only the envelope of the incoming sound is used and combined with the fine structure of an "enhanced omnidirectional" sound from microphones in a RITE/BTE-type hearing device. This combination can be done in several ways—either mathematically, following the inverse of the decomposition into envelope and phase, or it can be applied after beamforming, e.g. using a post filter.

In this way the amplified output of the hearing device is more resembling the "BTE/RITE sound" than "the CIC sound" and therefore more amplification can be applied with less risk for feedback. At the same time, the sound from the BTE/RITE is enriched by the pinna cues from the CIC microphone position.

Various embodiments of a hearing aid comprising at least two microphones, a processor and an output transducer are schematically illustrated in FIG. 1A-1H. It is assumed that at least one of the at least two microphones provide pinna effect (i.e. is located so as to pick op (frequency and angle dependent) acoustic cues provided by pinna). The pinna effect may e.g. be provided by a microphone located at or in the ear canal or elsewhere close to the ear canal, e.g. in concha. At least one of the at least two microphones may be located away from the ear canal, e.g. at or behind pinna. The at least one microphone located away from the ear canal may e.g. be located in a BTE-part adapted for being located away from the ear canal, e.g. at or behind pinna. The signal presented to the user may be based on a signal or signals from the at least one microphone located away from the ear canal. The output transducer may be located in the ear canal. The output transducer may be located in an ITE-part adapted for being located in the ear canal of the user. At least one of the at least two microphones may be located in the ITE-part. Two or more of the at least two microphones may be used to provide a beamformed signal (providing a signal quality improvement (e.g. a relatively reduced noise component providing an improved signal to noise ratio (SNR)). The two or more microphones contributing to the beamformed signal may be located away from the ear canal, e.g. in a BTE-part. A feedback control system for controlling acoustic (or mechanical) feedback from the output transducer to one or more of the at least two input transducers may form part of the hearing aid. The hearing aid may comprise an input unit adapted for receiving a wireless audio input from another device, e.g. from an audio capture device, in the environment of the user.

FIGS. 1A, 1B, 1C, 1D, 1E, 1F, 1G, and 1H each show respective embodiments of a hearing aid (HD) comprising a body-worn part (BW, BTE) comprising an input unit (IU11, IU12; IU11, . . . , IU1M, M≥1), e.g. a microphone (M1; M11, M12), and a processor (ASP), an ITE-part (ITE) adapted for being located in an ear canal of the user and comprising an output transducer (OT), and an input unit (IU2), e.g. a microphone (M2), adapted for being located to pick up acoustic reflections from pinna according to the present disclosure. The 'in-ear microphone' (M2) is e.g. adapted for being located in an ear of a user, e.g. near the entrance of an ear canal (e.g. at or in the ear canal or outside the ear canal but in the concha part of pinna). The aim of the location is to allow the microphone (M2) to pick up sound signals that include the cues resulting from the function of pinna (e.g. directional cues). The body-worn part (BW; BTE) may comprise any number (M) of input units, e.g. input transducers, e.g. a microphone and/or wireless audio receiver (cf. e.g. IU3 in FIG. 1H) for receiving an audio signal from an external (e.g. mobile) sound capturing device (e.g. a SmartPhone). Each input unit or transducer provides respective electric input signals (IN1, IN2; IN11, IN12, IN2; IN11, . . . , IN1M, IN2; IN11, . . . , IN1M, IN2, IN3). Each or the input transducers can theoretically be of any kind, such as comprising a microphone (e.g. a normal microphone or a vibration sensing bone conduction microphone), or an accelerometer, or a wireless receiver. Each of the output transducers (OT) are configured to convert a processed output signal to a stimulus perceivable by the user as sound. The output transducer may in general be located at any appropriate part on, or fully or partly inside the user's body. Preferably, the output transducer (OT) is located where its output stimuli are perceivable to the user. The output transducer may e.g. comprise a loudspeaker (often termed 'receiver' in the field of hearing aids). A loudspeaker can e.g. be located in an ear canal (RITE-type (Receiver-In-The-ear) hearing aid) or outside the ear canal (e.g. in a BTE-type hearing assistance device), e.g. coupled to a sound propagating element (e.g. a tube) for guiding the output sound from the loudspeaker to the ear canal of the user (e.g. via an ear mould). Alternatively, other output transducers can be envisioned, e.g. a vibrator of a bone anchored hearing aid, or a number electrodes of a cochlear implant hearing aid. The hearing aid further comprises an audio signal processor (ASP) operationally connected to the input units (IU11, IU12, IU2; IU11, . . . , IU1M, IU2; M1, M2; M11, M12, M2), and to the output transducer (OT). The 'operational connections' between the functional elements (audio signal processor, input units, and output transducer) of the hearing aid (HD) can be implemented in any appropriate way allowing signals to the transferred (possibly exchanged) between the elements (at least to enable a forward path from the input units to the output transducer, via (and in control of) the audio signal processor (ASP)). The connection between different (separate) parts of the hearing aid, e.g. a body-worn part (BW, BTE) and an in-the ear part (ITE) may include wired electric connections or wireless connections, e.g. based on electromagnetic signals, in which case the inclusion of relevant antenna and transceiver circuitry is implied. Further, an acoustic connection may be included between the body-worn part (BW, BTE) and the in-the ear part (ITE) in case the output transducer is located in the body-worn part.

The audio signal processor (ASP) is configured to process the electric audio input signals from the input units (IN1, IN2; IN11, IN12, IN2; IN11, . . . , IN1M, IN2; IN11, . . . , IN1M, IN2, IN3), and for providing a processed (preferably enhanced) output signal (OUT). The audio signal processor (ASP) may e.g. comprise a directional algorithm (cf. e.g. BF in FIG. 1D-1H) for providing an omni-directional signal or—in a particular DIR mode—a directional signal (YBF) based on one or more of the (first) electric input signals (IN11, IN12; IN11, . . . , IN1M). The audio signal processor (ASP) may comprise a post filter (PF) for processing the (first) electric audio input signal or signals (IN11, IN12; IN11, . . . , IN1M) or a processed version thereof, e.g. a beamformed signal (YBF), to provide a filtered signal (YNR), e.g. the processed output signal (OUT) based on information (e.g. acoustic characteristics) derived from the second electric input signal (IN2). The audio signal processor (ASP) may e.g. comprise a feedback control system configured to cancel or reduce acoustic or mechanical feedback from the output transducer (OT) to one or more of the input transducers.

All embodiments of the hearing aid are adapted for being arranged at least partly on a user's head or at least partly implanted in a user's head.

FIG. 1A schematically shows an embodiment of a hearing aid (HD) comprising a body-worn part (BW) adapted for being worn or located at an ear or elsewhere on the use user's head or e.g. upper part of the body. The body-worn part (BW) comprises a (first) microphone (M1) providing a (first) electric input signal (IN1) representing sound as received by the microphone (M1), and an audio signal processor (ASP), electrically connected to each other. The audio signal processor (ASP) provides a processed output signal (OUT) in dependence of the (first) electric input signal (IN1). The hearing aid (HD) further comprises an ITE-part adapted for being located in an ear canal of the user and comprising an output transducer (OT). The output transducer (OT) is electrically connected (e.g. via an electric conductor) to the audio signal processor (ASP) and configured to provide stimuli perceivable as sound to the user based on the processed output signal (OUT). The hearing aid (HD) further comprises a (second) microphone (M2) adapted for being located in a way allowing it to pick up acoustic reflections from pinna. The (second) microphone (M2) provides (second) electric input signal (IN2) representing sound as received by the microphone (M1). The (second) microphone (M2) is electrically connected (e.g. via an electric conductor) to the audio signal processor (ASP). The audio signal processor (ASP) thus receives (at least) first and second electric input signals (IN1, IN2) and provides the processed output signal (OUT) in dependence thereof. The (second) microphone (M2) may be located in the ITE-part or separately therefrom, e.g. in Pinna, such as in concha, e.g. in the cymba-region.

Figure 1B:
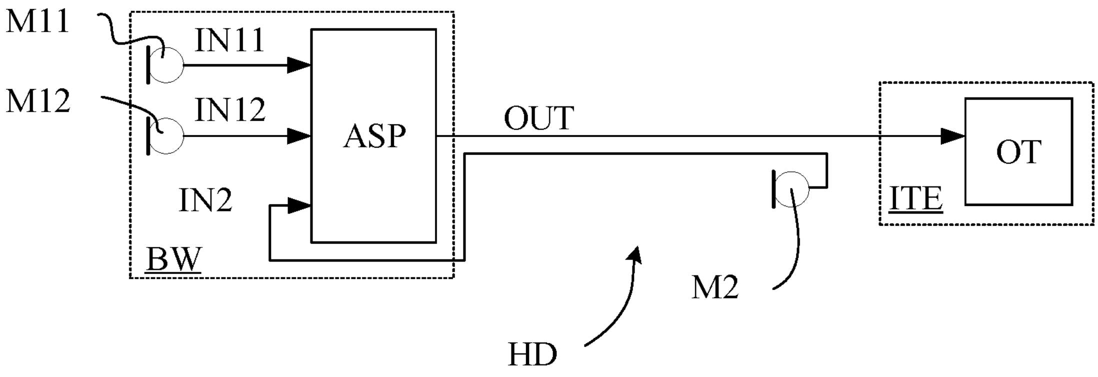
FIG. 1B schematically shows a second embodiment of a hearing aid comprising a body worn-part comprising two microphones and a processor, an ITE-part adapted for being located in an ear canal of the user and comprising an output transducer, and a microphone adapted for located to pick up acoustic reflections from pinna according to the present disclosure.

FIG. 1B schematically shows an embodiment of a hearing aid (HD) similar to the embodiment of FIG. 1A. In the embodiment of FIG. 1B, however, the body worn-part (BW) comprises two (first) microphones (M11, M12) providing respective (first) electric input signals (IN11, IN12) connected to the audio signal processor (ATS), thereby e.g. enabling beamforming (see e.g. embodiments of FIG. 1D-1H, 2A, 2B). Hence, the audio signal processor (ASP) receives (at least) two first and one second electric input signals (IN11, IN12, IN2) and provides the processed output signal (OUT) in dependence thereof.

Figure 1C:
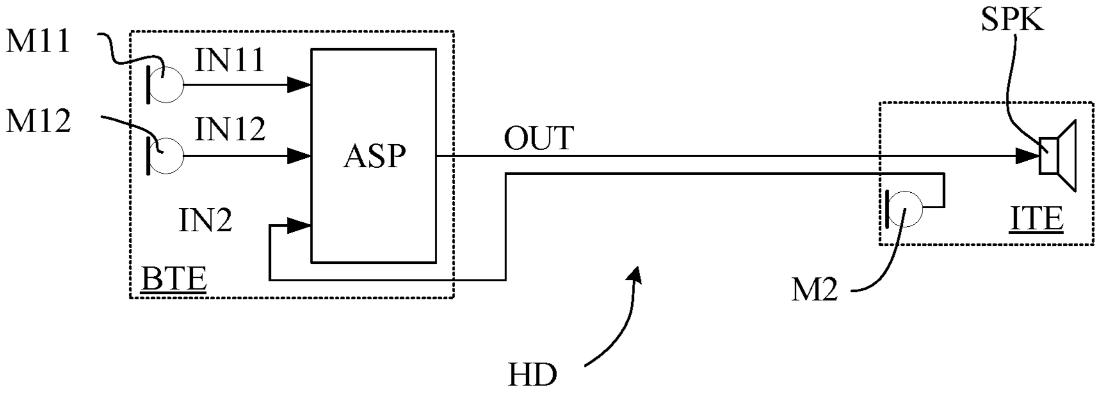
FIG. 1C schematically shows a third embodiment of a hearing aid comprising a BTE-part adapted for being worn at or behind an ear of the user and comprising two microphones and a processor, and an ITE-part adapted for being located in an ear canal of the user and comprising an output transducer and a microphone according to the present disclosure.

FIG. 1C schematically shows an embodiment of a hearing aid (HD) similar to the embodiment of FIG. 1B. In the embodiment of FIG. 1C, however, the body-worn part (BW in FIG. 1.A, 1B) is a BTE-part (BTE) configured to be located at or behind the ear (pinna) of the user. Further, the (second) microphone (M2) is located in the ITE-part. Further, the output transducer of the ITE-part is a loudspeaker (SPK) providing output stimuli to the user as vibrations in air. The electric connection between the BTE- and ITE parts may thus be provided in a common electric cable comprising an appropriate number of electric wires (e.g. 5 or more) for transmitting audio signals to (e.g. to SPK) and from (e.g. from M2) the ITE-part and to provide power to the ITE-part (e.g. to the microphone M2).

Figure 1D:
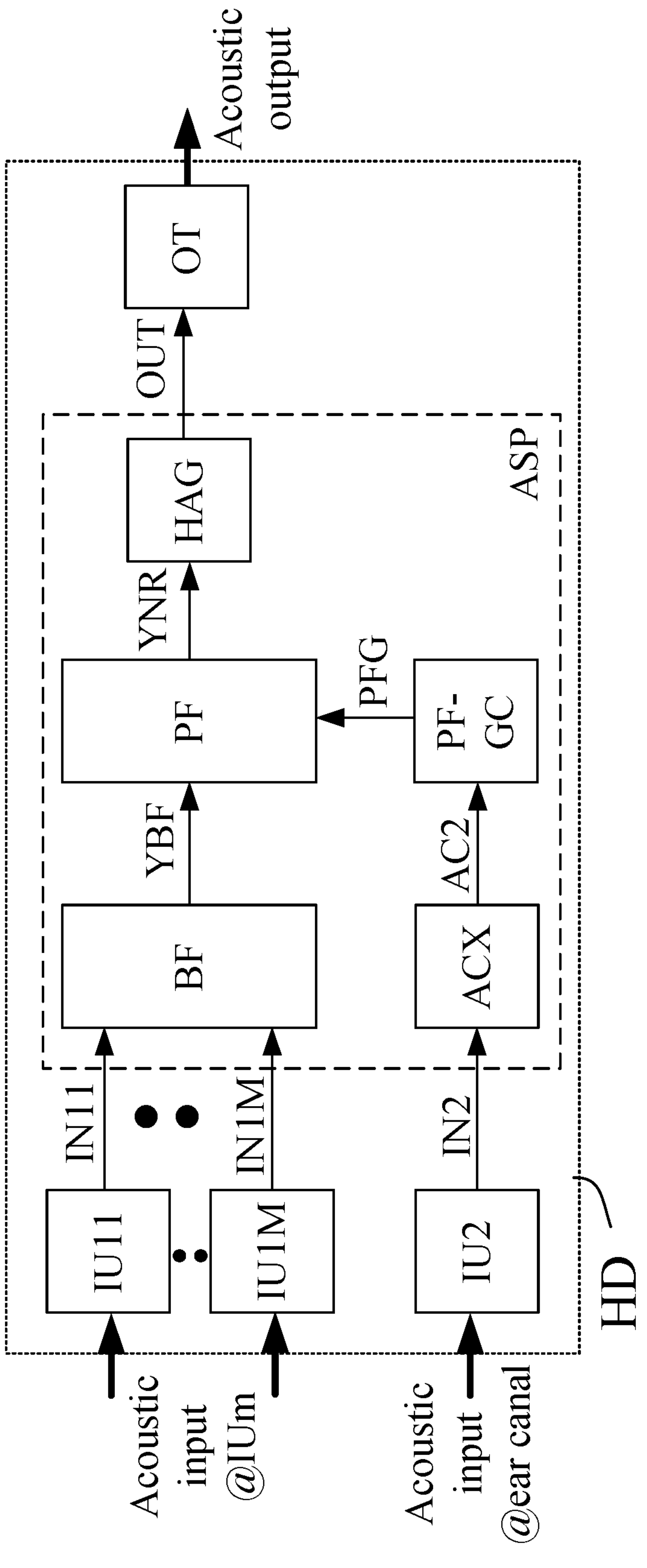
FIG. 1D schematically shows a fourth embodiment of a hearing aid comprising a) three input units, each comprising a microphone, one of the microphones being adapted to be located at or in an ear canal of the user to pick up acoustic reflections from pinna and two of the microphones being located elsewhere on the user's body, b) a processor comprising b1) a beamformer for processing signals from the two microphones located elsewhere on the user's body, b2) a postfilter for filtering the beamformed signal, b3) a hearing aid gain unit for processing the postfiltered signal, and respective b4) acoustic characteristics extraction and b5) postfilter gain determination units for processing a signal from said microphone located at or in the ear canal and providing postfilter gains to the postfilter, and c) an output transducer for presenting the processed signal from the hearing aid gain unit to the user, according to the present disclosure.

FIG. 1D schematically shows an embodiment of a hearing aid (HD) as e.g. shown in FIG. 1A-1C. The embodiment of a hearing aid of FIG. 1D comprises a number (M) of first (e.g. two or more, e.g. three or more) input units (IU11, . . . , IU1M, M≥2), each comprising an input transducer, e.g. a microphone, each configured to provide a (first) electric input signal (IN11, . . . , IN1M) based on acoustic signals at the respective input units (cf. 'Acoustic input @IUm'). Each of the M first input units (e.g. microphones) are adapted for being located away from an ear canal of the user, e.g. at or on the user's body, e.g. head, e.g. ear. The hearing aid (HD) of FIG. 1D further comprises at least one second input unit (IU2), e.g. at least one microphone, adapted to be located at or in an ear canal of the user to pick up acoustic reflections from pinna, and providing second electric input signal (IN2) representative thereof based on an acoustic signal at the input unit (IU2) (cf. 'Acoustic input @ear canal'). The hearing aid (HD) of FIG. 1D further comprises an audio signal processor (ASP) connected to the first and second input units (IU11, . . . , IU1M, IU2). The audio signal processor (ASP) comprises a beamformer (BF) for processing the first electric input signals (IU11, . . . , IU1M) from the M input units (e.g. microphones) located elsewhere than in or at the ear canal of the user and providing a beamformed signal (YBF) in dependence of said first electric input signals and predefined or adaptively updated beamformer weights ($w_{ij}$). The audio signal processor (ASP) further comprises a postfilter (PF) for filtering the beamformed signal (YBF) and providing a further processed ('enhanced') signal (YNR). The audio signal processor (ASP) further comprises a hearing aid gain unit (HAG) for processing the postfiltered signal (YNR) and providing a processed output signal (OUT). The audio signal processor (ASP) further comprises an acoustic characteristics extraction unit (ACX) for extracting acoustic characteristics of the ear of the user from the signal (IN2) from the input unit (IU2) (e.g. a microphone M2) located at or in the ear canal and providing an acoustic characteristics signal (AC2). The audio signal processor (ASP) further comprises a postfilter gain determination unit (PF-GC) providing postfilter gains (PFG) to the postfilter (PF). The postfilter gains (PFG) are applied to the beamformed signal (YBF) (or to a processed version thereof) in the postfilter (PF) to provide that the further processed ('enhanced') signal (YNR) comprises the acoustic characteristics of the ear of the user ('pinna cues'). The hearing aid (HD) further comprises an output transducer (OT) for presenting the processed signal (OUT) from the hearing aid gain unit (HAG) to the user (cf. 'Acoustic output').

Figure 1E:
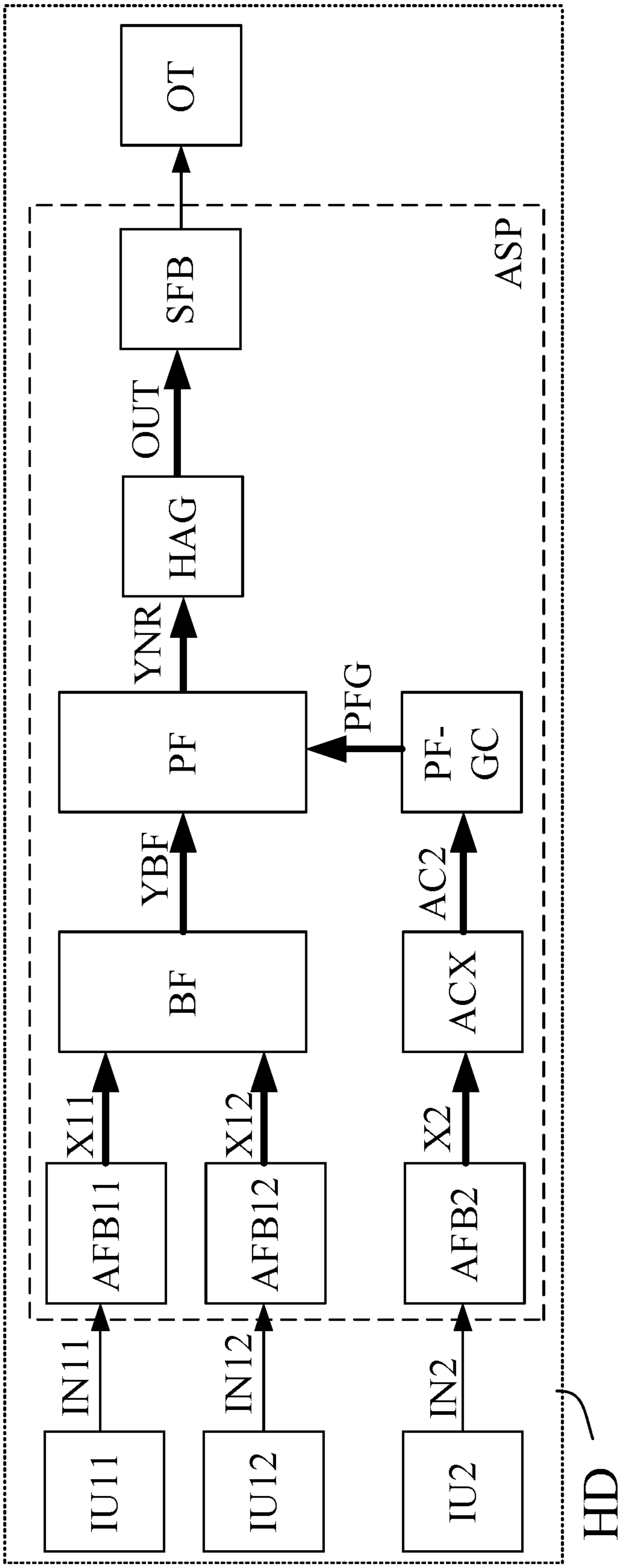
FIG. 1E schematically shows a fifth embodiment of a hearing aid according to the present disclosure as illustrated in FIG. 1D, but comprising respective filter banks allowing processing to be conducted in the time-frequency domain (individually in respective frequency sub-bands)

FIG. 1E schematically shows an embodiment of a hearing aid (HD) similar to the embodiment of FIG. 1D. In the embodiment of FIG. 1E, however, the hearing aid comprises two first input units (IU11, IU12) providing respective two first electric input signals (IN11, IN12) in the time domain (e.g. digitized according to a specific sampling frequency, e.g. 20 kHz). The embodiment of FIG. 1E, comprises respective filter banks (AFB11, AFB12, AFB2) providing the first and second electric signals (IN11, IN12, and IN2) in the time-frequency domain (cf. signals X11, X12 and X2, respectively). Thereby processing of the electric input signals in the audio signal processor (ASP) can be conducted in the time-frequency domain (individually in respective frequency sub-bands). To convert the processed output signal (OUT) to the time domain, the hearing aid (HD) further comprises a synthesis filter bank (SFB) to provide a time domain signal for being fed to the output transducer (OT). In case the output transducer (OT) is a multielectrode array of a cochlear implant hearing aid, the synthesis filter bank (SFB) can be dispensed with (stimuli of each frequency sub-band being fed to a particular one of the multitude of electrodes of the multi-electrode array). The analysis and synthesis filter banks are shown to form part of the audio signal processor (ASP). The filter bank-units may, however, form part of respective input and output units.

Figure 1F:
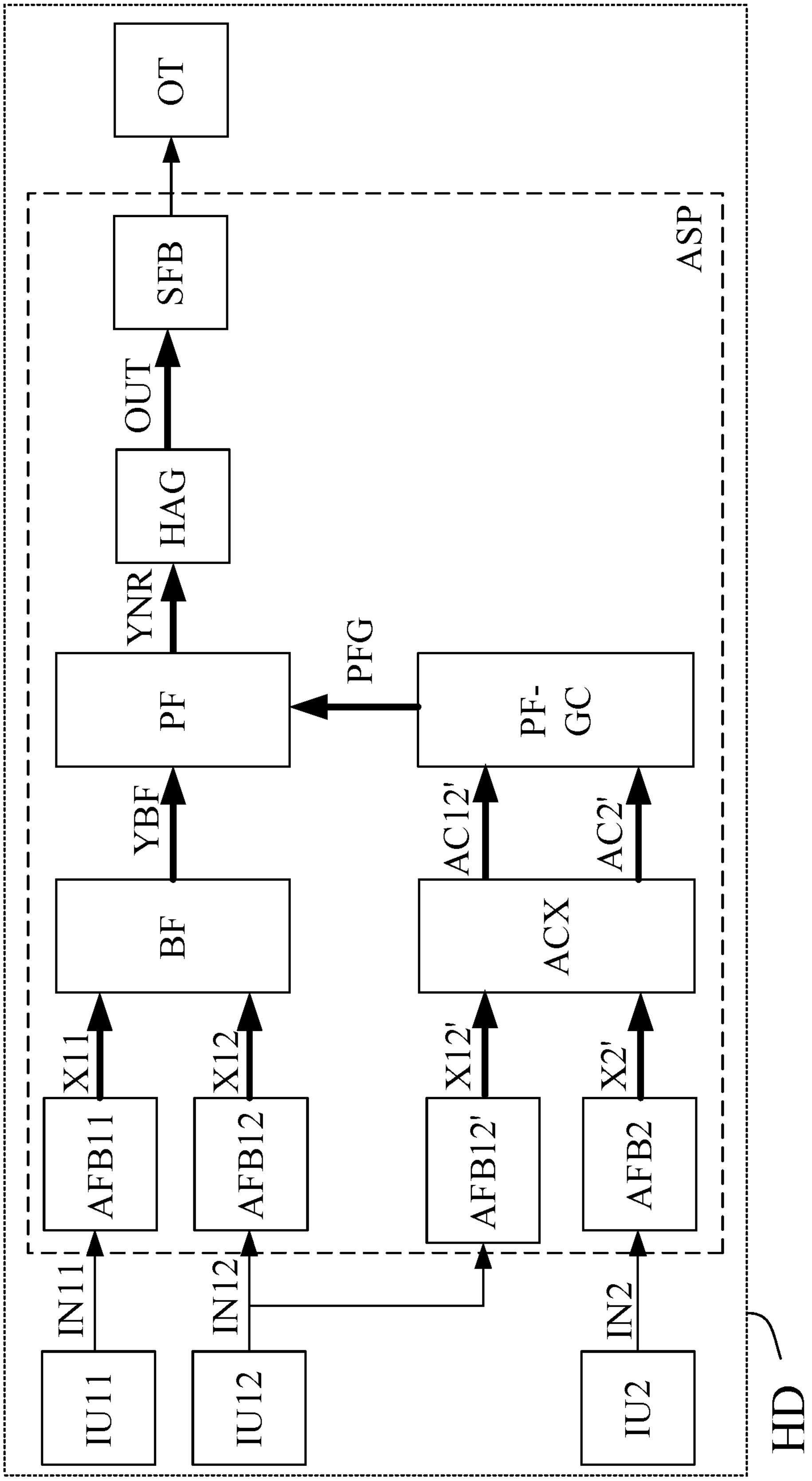
FIG. 1F schematically shows a sixth embodiment of a hearing aid according to the present disclosure as illustrated in FIG. 1E, but wherein additionally a signal from one or the microphones located elsewhere on the user's body is included in the determination of postfilter gains.

FIG. 1F schematically shows an embodiment of a hearing aid (HD) similar to the embodiment of FIG. 1E. In the embodiment of FIG. 1F, however, additionally a signal from one or the (first) input units located elsewhere on the user's body (than at or in the ear canal) is included in the determination of postfilter gains. In the embodiment of FIG. 1F, a first electric input signal (here IN12) is converted to the time-frequency domain (X12') in analysis filter bank AFB12', and the converted signal (X12') is used as input to the acoustic characteristics extraction unit (ACX) together with the correspondingly converted second electric input signal (X2') from the second input unit (IU2) located at or in the ear canal. The number of frequency sub-bands (or the order of the Fourier transform algorithm) of the analysis filter banks may be different (e.g. higher) in the forward path (processing first electric input signals X11, X12) than in the analysis path (processing second electric input signal X2' (and here also first electric input signal X12'). Otherwise (i.e., if equal), the first electric signal (X12) (already converted by analysis filter bank AFB12) could have been used directly as input to the acoustic characteristics extraction unit (ACX). Acoustic characteristics of both signals are extracted by the acoustic characteristics extraction unit (ACX) providing separate acoustic characteristics signals (AC12', AC2'). Instead, the characteristics extraction unit (ACX) may provide one acoustic characteristics signal (ΔAC) representative of a difference between the acoustic characteristics (e.g. levels and/or phases represented as complex values) of the second (X2') and first (X12') electric input signals. Based on the separate acoustic characteristics signals (AC12', AC2') or the 'differential' acoustic characteristics signal (ΔAC), the postfilter gain determination unit (PF-GC) provides postfilter gains (PFG) to the postfilter (PF), cf. e.g. FIG. 4A, 4B.

Figure 1G:
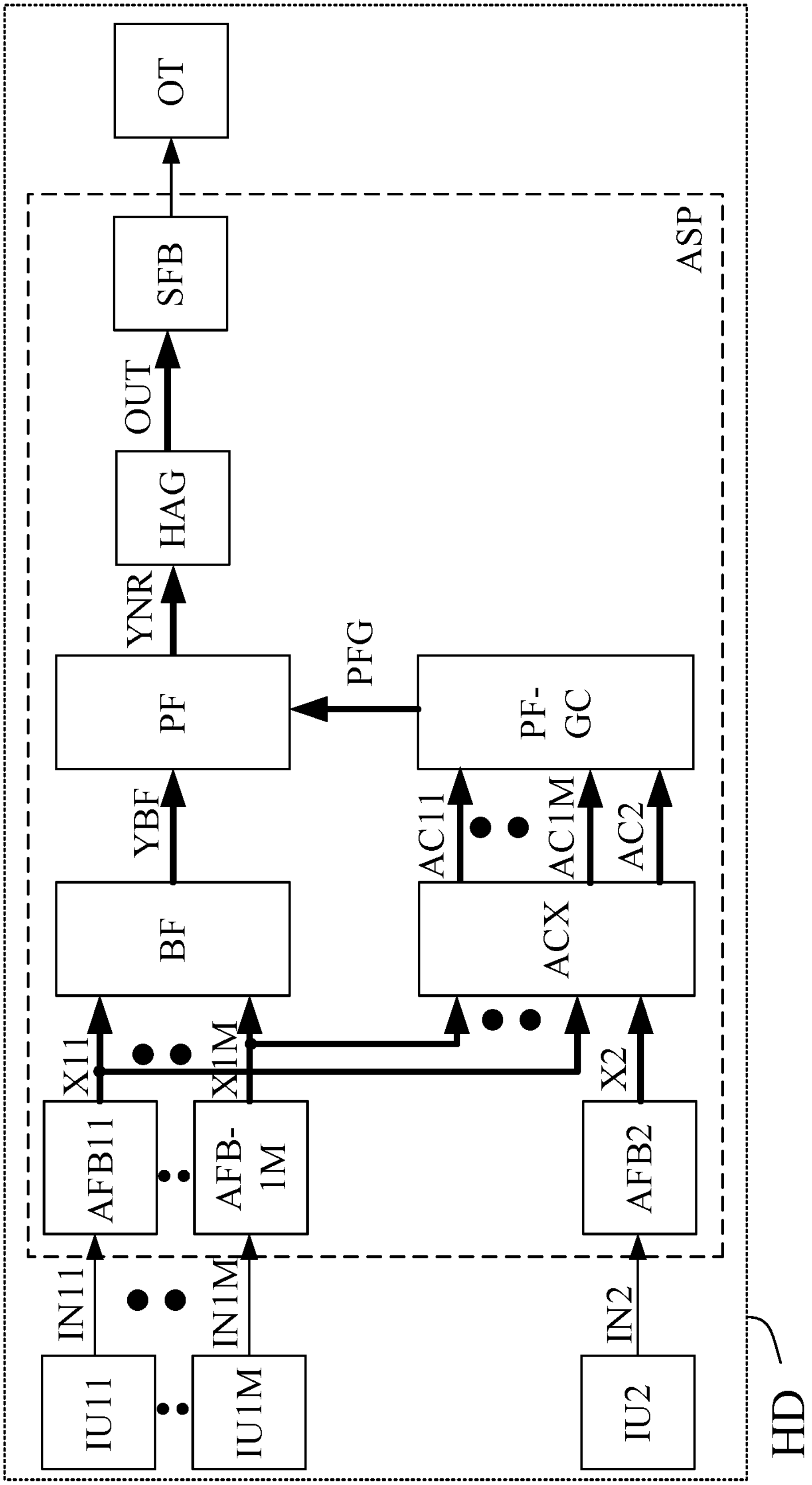
FIG. 1G schematically shows a seventh embodiment of a hearing aid according to the present disclosure as illustrated in FIG. 1F, but comprising M+1 input units, each comprising a microphone, and wherein at least one, e.g. all, signals from said M+1 microphones are included in the determination of the postfilter gains.

FIG. 1G schematically shows an embodiment of a hearing aid (HD) according to the present disclosure as illustrated in FIG. 1F, but comprising M first input units (IU11, . . . , IU1M) and one second unput unit (IU2), each comprising an input transducer, e.g. a microphone, and wherein at least one, e.g. all, first electric input signals (X11, . . . , X1M) from the M input units (e.g. microphones) are included in the determination of the postfilter gains (PFG). The hearing aid thus comprises M analysis filter banks (AFB11, . . . , AFB1M) to convert the first electric input signals from the time domain (IN11, . . . , IN1M) to the time-frequency domain (X11, . . . , X1M). In the embodiment of FIG. 1G, it has been assumed that the number of frequency sub-bands of the first and second electric input signals (X11, . . . , X1M, X2) is the same (or that appropriate 'SUM'-units are applied to the first electric input signals (X11, . . . , X1M) to equalize the number of frequency sub-bands to the number of sub-bands of the second electric input signal (X2). As in FIG. 1F, the acoustic characteristics extraction unit (ACX) provides separate acoustic characteristics signals (AC11, . . . , AC1M, AC2), which are used together in the postfilter gain determination unit (PF-GC) to determine the post filter gains PFG.

Figure 1H:
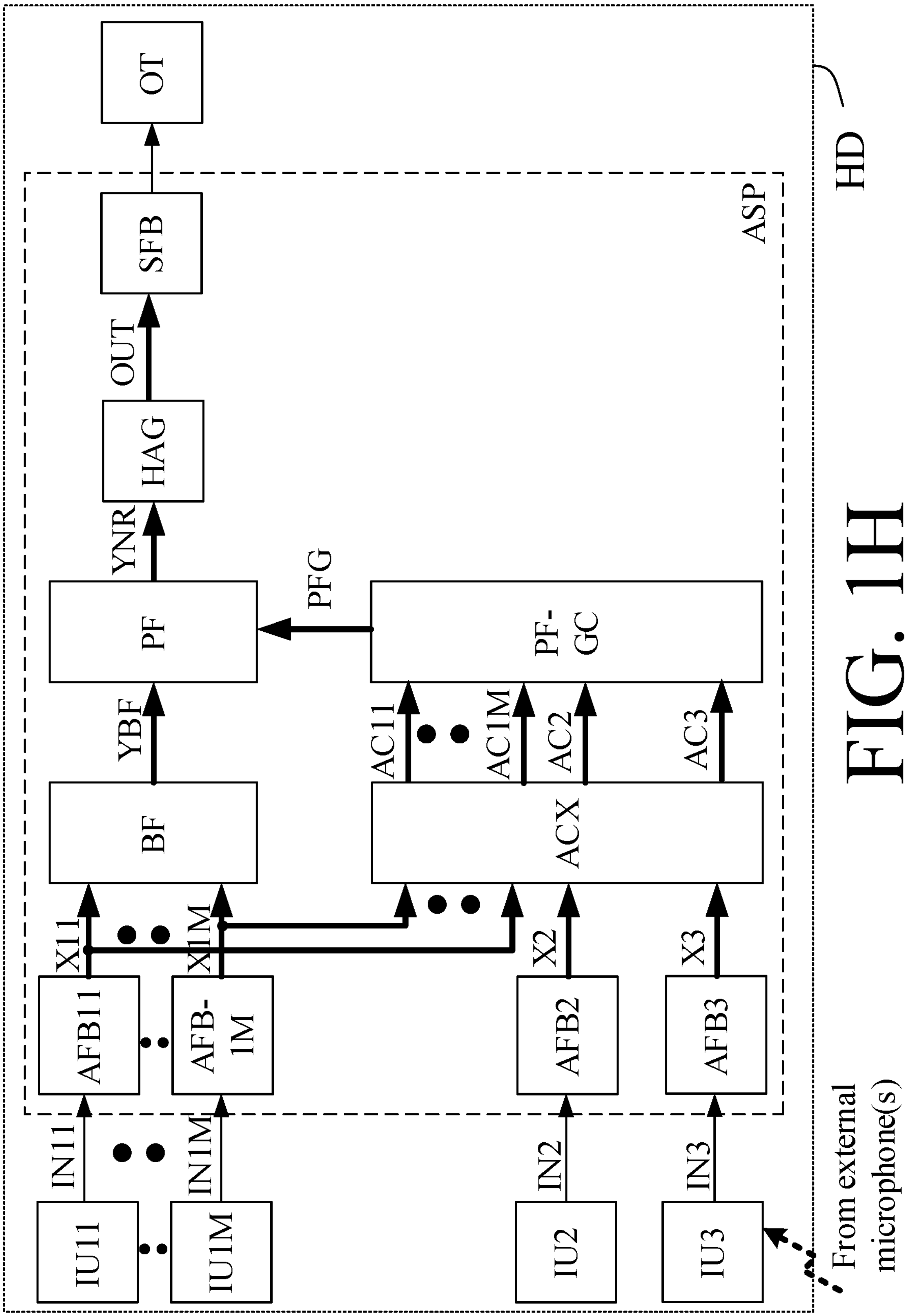
FIG. 1H schematically shows an eighth embodiment of a hearing aid according to the present disclosure as illustrated in FIG. 1G, but comprising an additional input unit configured to receive a microphone signal from another device or system, and wherein at least one, e.g. all, signals from said M+2 microphones are included in the determination of the postfilter gains, FIG. 2A schematically shows an embodiment of a hearing aid comprising three microphones, a processor, and an output transducer according to the present disclosure, the processor comprising a feedback control system for estimating and (ideally) cancelling feedback from the output transducer to each of the three microphones.

FIG. 1H schematically shows an embodiment of a hearing aid (HD) according to the present disclosure as illustrated in FIG. 1G, but comprising an additional input unit (IU3) configured to receive a microphone signal from another device or system, and wherein at least one, e.g. all, electric input signals from the M+1 input units (IU11, . . . , IU1M, IU3), in addition to the one (IU2) located at or in the ear canal, are included in the determination of the postfilter gains. FIG. 1H shows an embodiment of a hearing aid (HD) wherein a microphone signal from an external device (e.g. not worn by the user) is included in the determination of the post filter gains (PFG). Such external microphone signal may e.g. originate from a conference room microphone array, a phone, or a microphone worn by another person (than the hearing aid user), or a microphone a contralateral hearing aid (forming part of a binaural hearing aid system together with the hearing aid in question and worn by the user). An advantage of using an (e.g. one or more) external microphone is that it may pick up a cleaner estimate of the target signal (or a cleaner noise estimate) compared to what can be picked up by the microphones located in the hearing device. Either because the external microphone is closer to the signal of interest or because the external device has more processing power (e.g. sharper beamformers). Hereby an improved postfilter gain can be obtained. Furthermore, the external microphone is not contaminated by feedback.

If further reduction of feedback risk is needed, the sound at the ear canal can be picked up by a directional microphone system (cf. e.g. 'Beamformer' in FIG. 2B), which is optimized for picking up the external sound, whilst suppressing the amplified sound from the ear canal (as e.g. discussed in EP3506658A1.

Figure 2A:
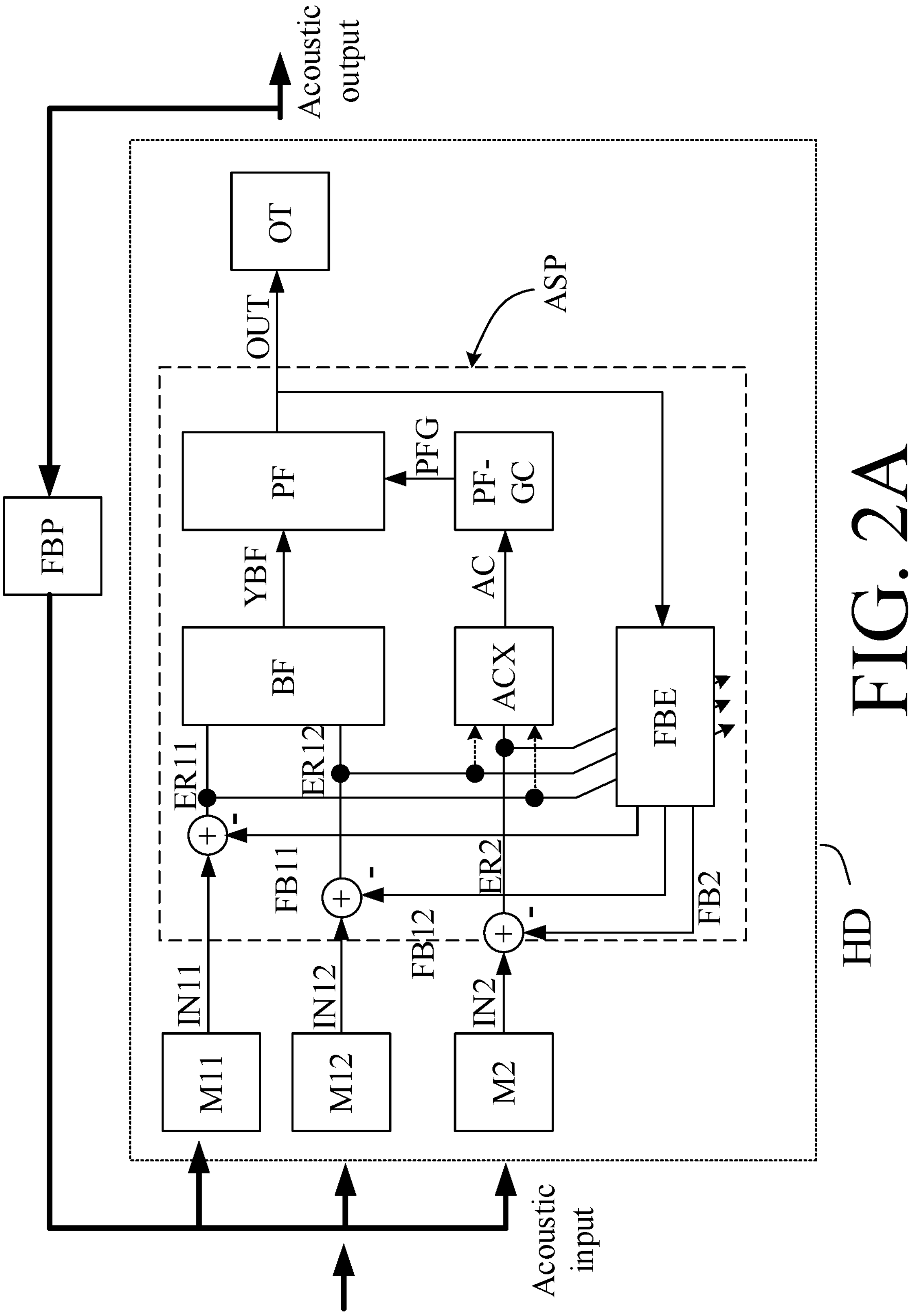
FIG. 2B schematically shows a nineth embodiment of a hearing aid comprising an ITE-part and a BTE part, each of the ITE- and BTE-parts comprising two microphones and a beamformer, each beamformer providing a beamformed signal based on the respective two microphone signals, the BTE-part further comprising a post filter for filtering the beamformed signal provided by the beamformer of the BTE-part and a hearing aid gain unit for applying one or more processing algorithms to the filtered signal and providing a processed signal, the hearing aid further comprising an acoustic characteristics extraction postfilter gain determination unit for processing the beamformed signal from the ITE-part and applying postfilter gains to the postfilter.
FIG. 2C schematically shows a tenth embodiment of a hearing aid according to the present disclosure comprising three microphones, a processor, and an output transducer, including a feedback control system for estimating and (ideally) cancelling feedback from the output transducer to each of the three microphones (as in FIG. 2A), and further comprising a controller for controlling a current mode of operation of the hearing aid.
Figure 2B:
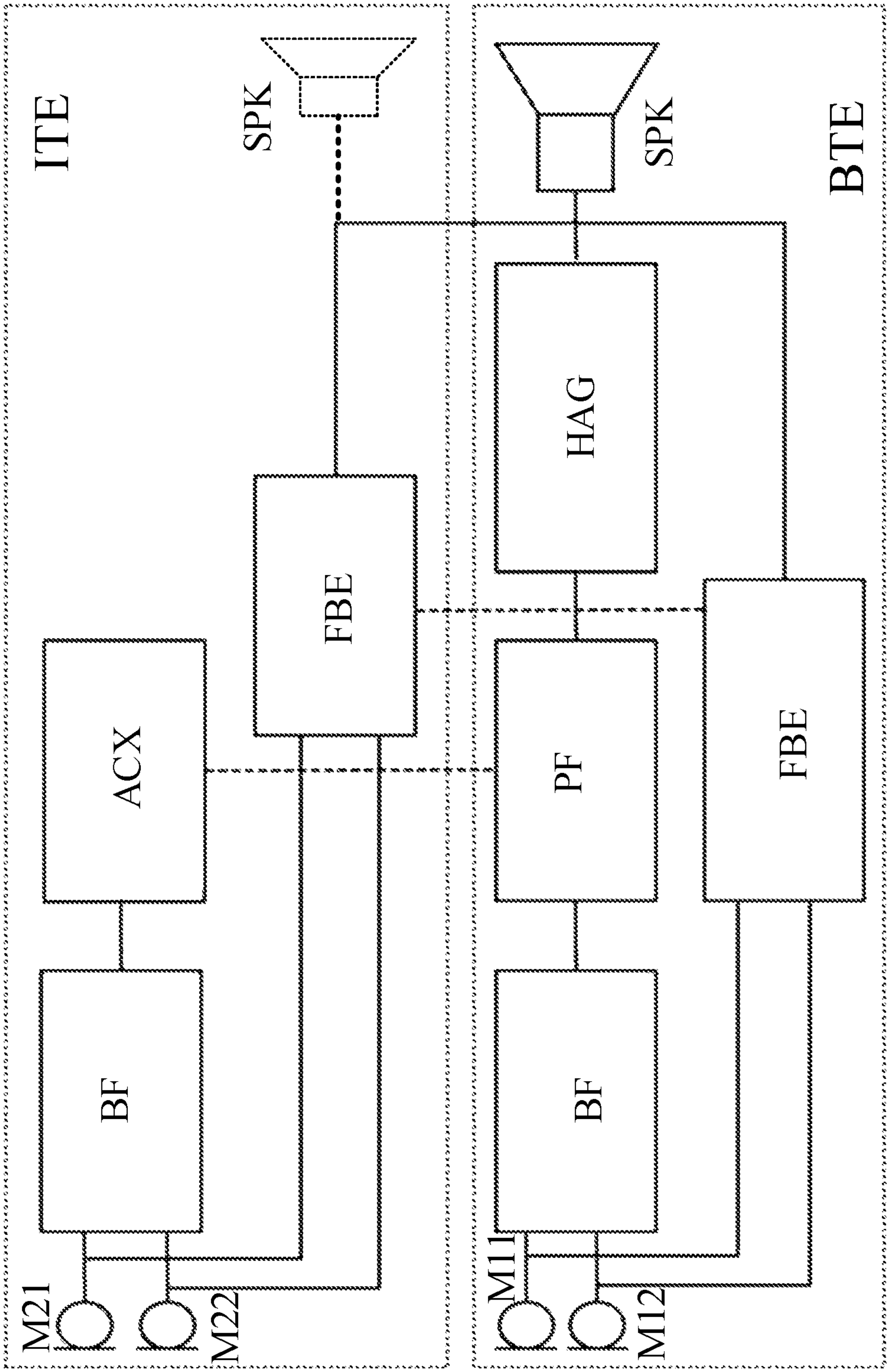

If even further reduction of feedback is needed, an open loop feedback system can be used (shown as Feedback Cancellation for the IIC/CIC unit in the above drawing). This feedback cancellation system is somehow in an open loop, as the sound signals entering the CIC microphones are not directly amplified and presented at the receiver (loudspeaker), only the envelope is (indirectly) used to generate the BTE loudspeaker signal. Moreover, the CIC feedback cancellation system differs from the BTE feedback cancellation system; although a potential feedback problem in the CIC unit would affect the envelope extraction, it would not cause an instant stability problem as in the BTE unit, hence only a relatively slow cancellation system will likely be sufficient. The feedback cancellation system can work on the microphone signals (as illustrated in FIG. 2A, 2B), or it can work on the beamformer signal.

The reliability of the in-ear microphone signal can be estimated from a feedback path estimator, either independently or relatively between the in-ear microphone and the BTE-microphones.

Application of the envelope cues can be done either by means of the absolute envelope (as described below) or by means of the envelope difference between the in-ear microphone and the BTE microphone. The latter idea may be most suitable for implementation in a post-filter type structure.

Comparison of the envelopes and fine-structure of the in-ear microphone and the BTE microphone can help estimate the time and phase delay between the microphones and thus may inform about the insertion depth of the in-ear microphone in the ear canal. This can guide the HCP during the fitting process and can also be used for training purposes or for daily quality checks and be used to give feedback to the user to help ensure more optimal benefit from the device.

The (smart) combination of the ITE and BTE parts may increase the amplification provided to the user to levels above that achievable in separate devices.

This can lead to several user benefits—better localization, better understanding of speech in competing speakers, less wind noise in the microphones and so forth.

FIG. 2A shows an embodiment of a hearing aid (HD) according to the present disclosure. The hearing aid (HD) comprises three microphones (M11, M12 M2), two first microphones (M11, M12) adapted for being located away from an ear canal of the user, and a second microphone (M2) adapted for being located at or in an ear canal of the user. The hearing aid (HD) further comprises a processor (ASP) for processing the electric input signals (IN11, IN12, IN2) from the three microphones and providing a processed signal (OUT) in dependence thereof. The hearing aid (HD) further comprises an output transducer (OT). The configuration of the hearing aid of FIG. 2A is similar to that of FIG. 1G, except that two first input units (microphones M11, M12) (instead of M) are shown in FIG. 1G, and that filter banks (AFB, SFB) are not shown in FIG. 1G. The processor (ASP) comprises, however, additionally a feedback control system (FBE and respective sum units '+') for estimating and (ideally) cancelling feedback (cf. feedback paths (FBP)) from the output transducer (OT) to each of the three microphones (M11, M12, M2). The feedback estimation unit (FBE) is configured to estimate a feedback signal component (FB11, FB12, FB2) in the respective electric input signals (IN11, IN12, IN2). The estimated feedback signal components (FB11, FB12, FB2) are subtracted from the respective electric input signals (IN11, IN12, IN2) in respective SUM-units (+) thereby providing respective feedback corrected input signals (ER11, ER12, ER2). Respective adaptive algorithms in the feedback estimation unit provides adaptively updated filter coefficients to respective variable filters, which provide respective estimates of the feedback signal components (FB11, FB12, FB2) in the respective electric input signals (IN11, IN12, IN2) by minimizing the feedback corrected input signals (ER11, ER12, ER2) given the reference signal (OUT) as input to the variable filters. Further, the second feedback corrected signal (ER2), or all the feedback corrected input signals (ER11, ER12, ER2), is/are used as input(s) to the acoustic characteristics extraction unit (ACX), cf. dotted arrows (for ER11, ER12) to the characteristics extraction unit (ACX). The characteristics extraction unit (ACX) provides a single acoustic characteristics signal (AC), which is used in the postfilter gain determination unit (PF-GC) to determine the (possibly complex) post filter gains PFG (cf. e.g. FIG. 4A, 4B). An advantage of using the feedback corrected signals as inputs to the acoustic characteristics extraction unit (ACX) is that the signals are (ideally) not 'polluted' by feedback signal components that might colour or hide the extracted acoustic characteristics of pinna.

FIG. 2B schematically shows an embodiment of a hearing aid (HD) comprising an ITE-part (ITE) and a BTE part (BTE), each of the ITE- and BTE-parts comprising two microphones (M21, M22) and (M11, M12), respectively, and a beamformer (BF-ITE and BF-BTE, respectively), each beamformer providing a beamformed signal based on the respective two microphone signals. The BTE-part further comprises a post filter (PF) for filtering the beamformed signal provided by the beamformer (BF-BTE) of the BTE-part and providing a filtered signal. The BTE-part further comprises a hearing aid gain unit (HAG) for applying one or more processing algorithms to the filtered signal and providing a processed signal. The hearing aid further comprises an acoustic characteristics extraction and postfilter gain determination unit (ACX, PF) for processing the beamformed signal from the ITE-part and applying postfilter gains to the postfilter (PF). In the embodiment of FIG. 2B, the acoustic characteristics extraction unit (ACX) is located in the ITE-part. It may, however, be located in the BTE-part. Likewise, the determination of postfilter gains from the acoustic characteristics may be located in a separate postfilter gain determination unit (PF-GC) (as in the embodiment of FIG. 2A) but may as well form part of the acoustic characteristics extraction unit (ACX) or of the postfilter (PF) and may be located either in the ITE-part or in the BTE-part. In the embodiment of FIG. 2B, the loudspeaker (SPK) is located in the BTE-part (BTE) and e.g. connected to the ITE-part via an acoustic tube. It may, however, as indicated by dotted outline in FIG. 2B, be located in the ITE-part (ITE) and connected to the BTE-part via an electric cable.

Figure 2C:
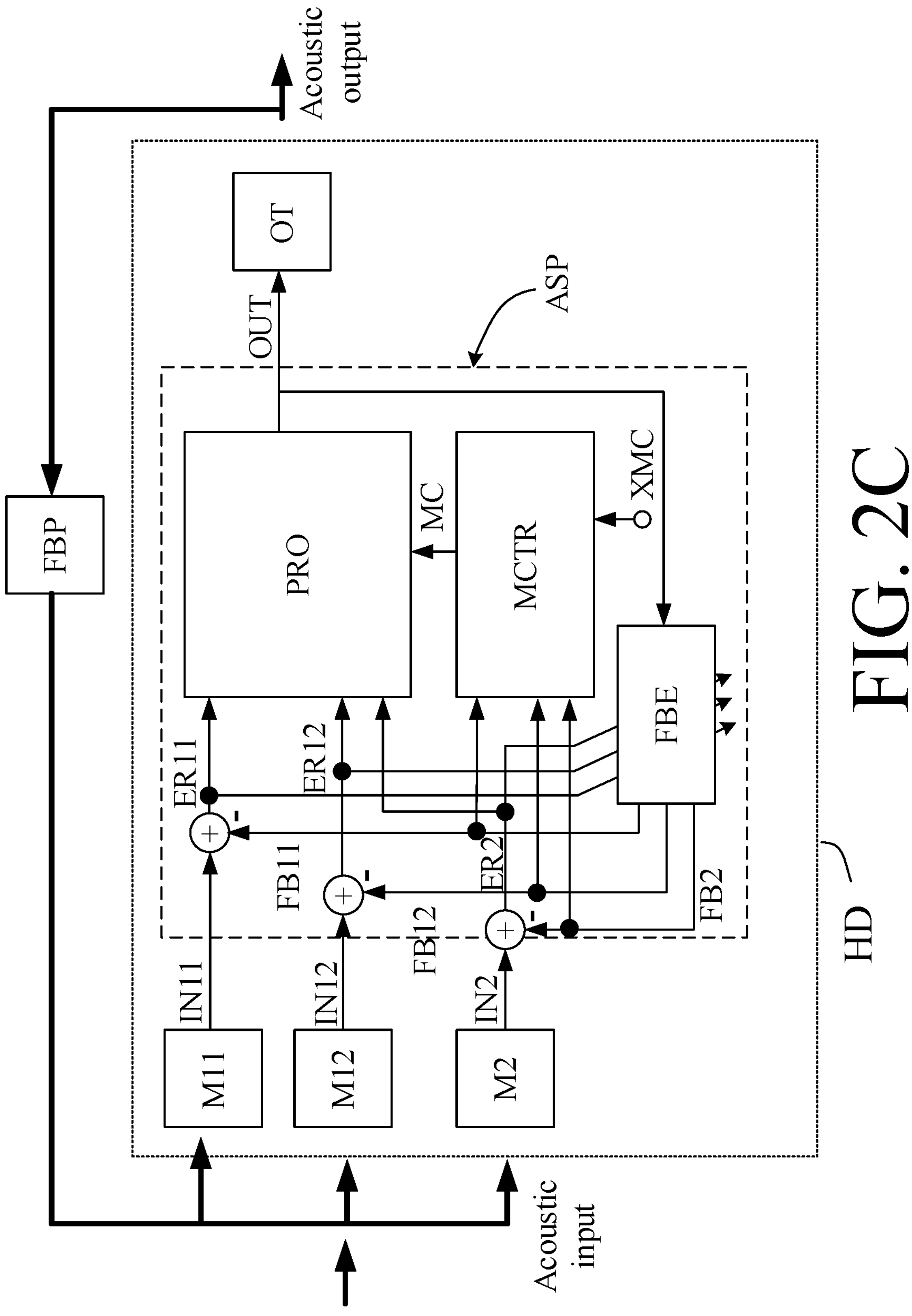

FIG. 2C schematically shows an embodiment of a hearing aid (HD) according to the present disclosure comprising three microphones, a processor, and an output transducer, including a feedback control system for estimating and (ideally) cancelling feedback from the output transducer to each of the three microphones (as in FIG. 2A). The hearing aid further comprises a controller (MCTR) for controlling a current mode of operation of the hearing aid (cf. mode control signal (MC) from the mode controller to the signal processing unit (PRO). The signal processing unit may e.g. comprise the beamformer (BF), the postfilter (PF), the acoustic characteristics extractor (ACX), and the postfilter gain determination unit (PF-GC) of the embodiment of FIG. 2A. It may further comprise a hearing aid gain unit (HAG) for applying further processing algorithms (e.g. compressive amplification to compensate for the user's hearing impairment) to a signal of the forward path before providing the processed signal (OUT) to be presented to the user via the output transducer (OT).

As in FIG. 2A, the hearing aid (HD) comprises a feedback control system for estimating and attenuating (or cancelling) feedback from the output transducer (OT) to the 'first' and 'second' microphones (M11, M12, M2). The feedback control system, e.g. the mode controller (MCTR), may be configured to provide a reliability estimate of the second electric input signal (IN2) in dependence of the feedback estimate(s) (FB11, FB12, FB2). The reliability estimate may be provided in absolute terms for the second electric input signal (IN2), or it may be provided as a relative measure, e.g. between the second electric input signal and one or more of the at least one first electric input signals (IN11, IN12) (e.g. based on the corresponding feedback measures (FB11, FB12, FB2)).

In case the feedback estimate from the output transducer (OT) to the second microphone (M2) is considered to be non-critical (e.g. evaluated by the mode control unit (MCTR) receiving the three feedback estimates (FB11, FB12, FB2)), the processed signal (OUT) of the audio signal processor (ASP, here provided by the signal processing unit (PRO)) may be based on (such as exclusively based on) the second electric signal (IN2) or (as here) on a signal derived therefrom (the feedback corrected signal ER2, which is fed to the signal processing unit (PRO) together with the feedback corrected signals ER11, ER12 originating from the two first microphones M11, M12). In such case the extraction of pinna cues and application to the at least one first electric signal or a signal derived therefrom may be dispensed with (because the cues are included in the feedback corrected signal ER2 originating from second microphone (M2)). The use of the pinna cue extraction procedure according to the present disclosure may, however, be decided on a frequency band level (so that in some frequency bands the pinna cues are extracted and applied to the first electric input signals (e.g. from BTE-microphones, or to the respective frequency bands of a beamformed signal) and in other frequency bands, the second electric input signal (e.g. from an ITE microphone) is used to provide the processed signal of the forward path (e.g. used in the beamformer to provide the beamformed signal YBF (in such frequency bands)).

Figure 3:
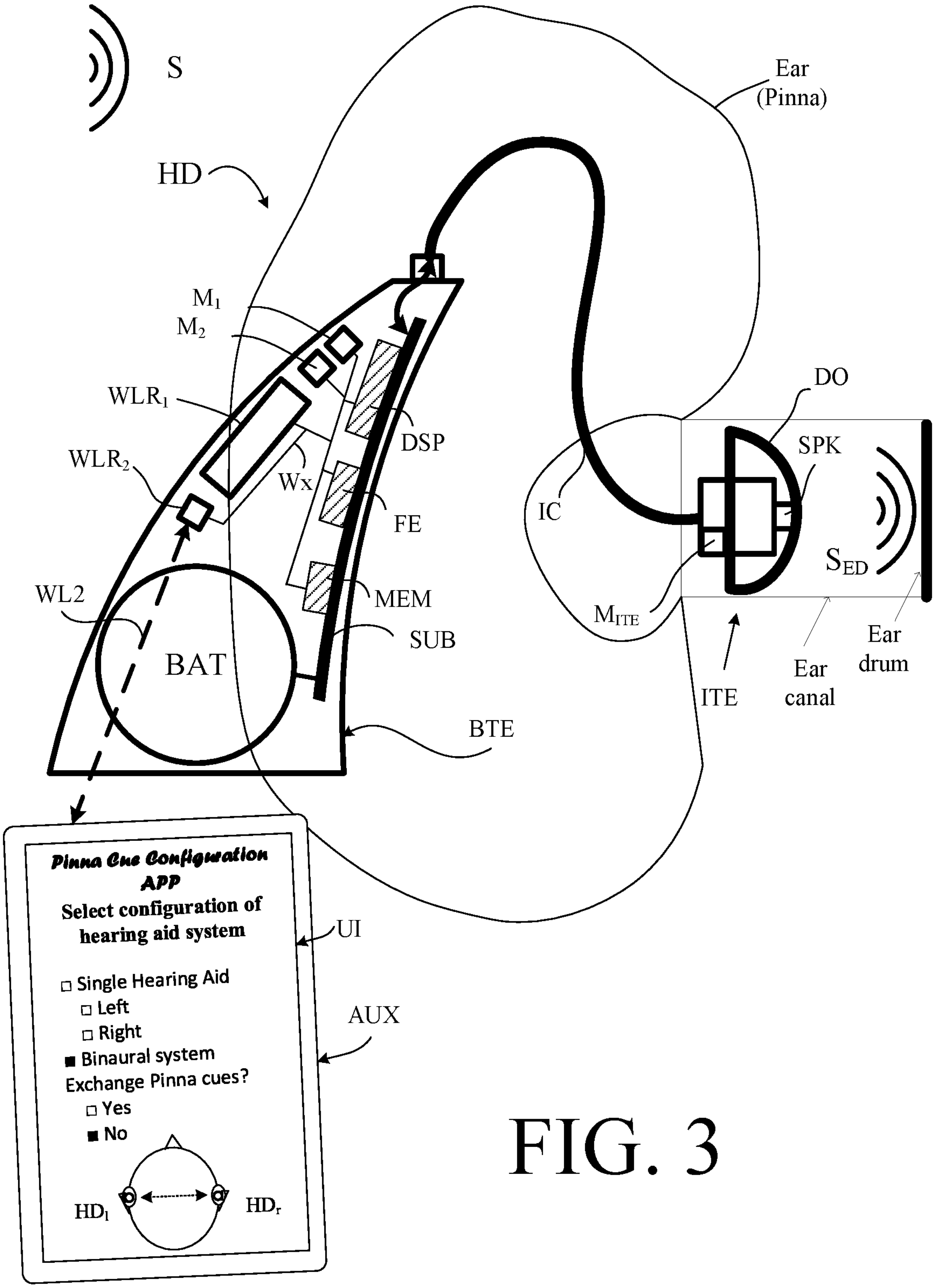
FIG. 3 shows an embodiment of a hearing aid according to the present disclosure comprising a BTE-part located behind an ear of the user and an ITE part located in an ear canal of the user in communication with an auxiliary device comprising a user interface for the hearing aid.

The application of the extracted pinna cues to the first electric input signal(s) (or to a signal derived therefrom, e.g. YBF in FIG. 2A) may be made dependent on feedback estimates (FB11, FB12, FB2) provided by a feedback estimator (FBE) to the mode control unit (MCTR), and/or it may be made dependent on the selection of a specific mode of operation (e.g. a specific hearing aid program), e.g. selected from a user interface (cf. e.g. input signal XMC to the mode control unit (MCTR), which may originate from a user's input to the user interface (cf. e.g. FIG. 3).

FIG. 3 shows an embodiment of a hearing device (HD), e.g. a hearing aid, according to the present disclosure comprising a BTE-part located behind an ear (Ear (Pinna)) of a user and an ITE part located in an ear canal of the user in communication with an auxiliary device (AUX) comprising a user interface (UI) for the hearing device. FIG. 3 illustrates an exemplary hearing aid (HD) formed as a receiver in the ear (RITE, Receiver-In-The-Ear) type hearing aid comprising a BTE-part (BTE) adapted for being located at or behind pinna (Ear (Pinna)) and a part (ITE) comprising an output transducer (e.g. a loudspeaker/receiver) adapted for being located in an ear canal (Ear canal) of the user (e.g. exemplifying a hearing aid (HD) as shown in FIG. 1A-1H, or FIG. 2A-2B). The BTE-part (BTE) and the ITE-part (ITE) are connected (e.g. electrically connected) by a connecting element (IC). In the embodiment of a hearing aid of FIG. 3, the BTE part (BTE) comprises two input transducers (here microphones) ($M_1$, $M_2$) each for providing an electric input audio signal representative of an input sound signal from the environment (in the scenario of FIG. 3, including sound source S). The hearing aid of FIG. 3 further comprises two wireless receivers or transceivers ($WLR_1$, $WLR_2$) for providing respective directly received auxiliary audio and/or information/control signals (and optionally for transmitting such signals to other devices). The hearing aid (HD) comprises a substrate (SUB) whereon a number of electronic components are mounted, functionally partitioned according to the application in question (analogue, digital, passive components, etc.), but including a signal processor (DSP), a front-end chip (FE) mainly containing analogue circuitry and interfaces between analogue and digital processing, and a memory unit (MEM) coupled to each other and to input and output units via electrical conductors Wx. The mentioned functional units (as well as other components) may be partitioned in circuits and components according to the application in question (e.g. with a view to size, power consumption, analogue vs digital processing, radio communication, etc.), e.g. integrated in one or more integrated circuits, or as a combination of one or more integrated circuits and one or more separate electronic components (e.g. inductor, capacitor, etc.). The signal processor (DSP) provides an enhanced audio signal (cf. signal OUT in FIG. 1A-1H, or FIG. 2A-2B), which is intended to be presented to a user. In the embodiment of a hearing aid device in FIG. 3 the ITE part (ITE) comprises an output unit in the form of a loudspeaker (receiver) (SPK) for converting the electric signal (OUT) to an acoustic signal (providing, or contributing to, acoustic signal $S_{ED}$ at the ear drum (Ear drum). The ITE-part may further comprise an input unit comprising one or more input transducer (e.g. microphones). In FIG. 3, the ITE part comprises a microphone ($M_{ITE}$) located at an entrance to the ear canal of the user. The ITE-microphone ($M_{ITE}$) is configured to provide an electric input audio signal representative of an input sound signal from the environment at or in the ear canal (i.e. including any acoustic modifications of the input signal due to pinna, reflecting the acoustic characteristics of pinna). In another embodiment, the hearing aid may further comprise an input unit (e.g. a microphone or a vibration sensor) located elsewhere than at the entrance of the ear canal (e.g. facing the eardrum) in combination with one or more input units located in the BTE-part and/or the ITE-part. The ITE-part further comprises a guiding element, e.g. a dome, (DO) (or an open or closed mould) for guiding and positioning the ITE-part in the ear canal of the user.

The hearing aid (HD) exemplified in FIG. 3 is a portable device and further comprises a battery (BAT) for energizing electronic components of the BTE- and ITE-parts.

The hearing aid (HD) comprises a directional microphone system (beamformer filter (BF in FIG. 1D-1G, 2A, or 'Beamformer' in FIG. 2B)) adapted to enhance a target acoustic source relative to a multitude of acoustic sources in the local environment of the user wearing the hearing aid device (e.g. based on the first electric input signals from the first microphones ($M_1$, $M_2$) alone or in combination with the second electric input signal from the second microphone ($M_{ITE}$) (e.g. in dependence of a feedback measure). The memory unit (MEM) may comprise predefined (or adaptively determined) complex, frequency dependent constants defining predefined or (or adaptively determined) beam patterns, etc., together determining the resulting beamformed signal YBF in dependence of the current electric input signals (cf. e.g. FIG. 1D-1G, 2A, 2B).

The memory (MEM) may e.g. comprise data related to the acoustic characteristics of the human ear, e.g. the ear of the user, e.g. predetermined or adaptively updated pinna gain vs. level difference data for estimating a relation between pinna gain and level difference between a second (e.g. ITE-) and (e.g. BTE-) first microphone signal according to the present disclosure.

It may be advantageous to have access to complex valued pinna gains determined from differences in complex valued microphone signals.

The hearing aid of FIG. 3 may constitute or form part of a hearing aid and/or a binaural hearing aid system according to the present disclosure.

The hearing aid (HD) according to the present disclosure may comprise a user interface UI, e.g. as shown in FIG. 3 implemented in an auxiliary device (AUX), e.g. a remote control, e.g. implemented as an APP in a smartphone or other portable (or stationary) electronic device. In the embodiment of FIG. 3, the screen of the user interface (UI) illustrates a Pinna Cue Configuration APP. The screen 'Select configuration of hearing aid system' allows a user to decide how the pinna cue extraction system according to the present disclosure is configured. The user may indicate whether a monaural (Single Hearing Aid system) of a binaural system comprising left and right hearing aids currently relevant. The user may further for a monaural system indicate whether the hearing aid is located at the left or right ear. The user may further for a binaural system indicate whether the hearing aids should exchange Pinna cues or not. In the shown example, a binaural system is selected (cf. solid tick box (■) at 'Binaural system'). It is further selected that the Pinna cues should not be exchanged between the left and right hearing aids ($HD_l$, $HD_r$) (cf. solid tick box (■) at 'No' under the heading 'Exchange Pinna cues?'). The auxiliary device and the hearing aid are adapted to allow communication of data representative of the currently selected configuration via a, e.g. wireless, communication link (cf. dashed arrow WL2 in FIG. 3). The communication link WL2 may e.g. be based on far field communication, e.g. Bluetooth or Bluetooth Low Energy (or similar technology, e.g. UWB), implemented by appropriate antenna and transceiver circuitry in the hearing aid (HD) and the auxiliary device (AUX), indicated by transceiver unit WLR2 in the hearing aid. The transceiver in the hearing aid indicated by WLR1 may be for establishing an interaural link, e.g. for exchanging audio signals (or parts thereof), and/or pinna cues, or other control or information parameters between the left and right hearing aids ($HD_l$, $HD_r$) of a binaural hearing aid system. The interaural link may e.g. be implemented as an inductive link or as the communication link (WL2).

Other aspects related to the control of hearing aid (e.g. the beamformer), the volume setting, specific hearing aid programs for a given listening situation, etc.) may be made selectable or configurable from the user interface (UI). The user interface may e.g. be configured to allow a user to decide whether or not to extract pinna cues from the second electric input signal(s) and apply them to the first electric input signal(s) (or to a signal derived therefrom, e.g. YBF in FIG. 2A). This may be made dependent on one or more feedback estimates (FB11, FB12, FB2) provided by a feedback estimator (FBE) and e.g. made selectable from the user interface (UI) (e.g. by selecting a specific of a specific mode of operation (e.g. a specific hearing aid program)).

Figure 4A:
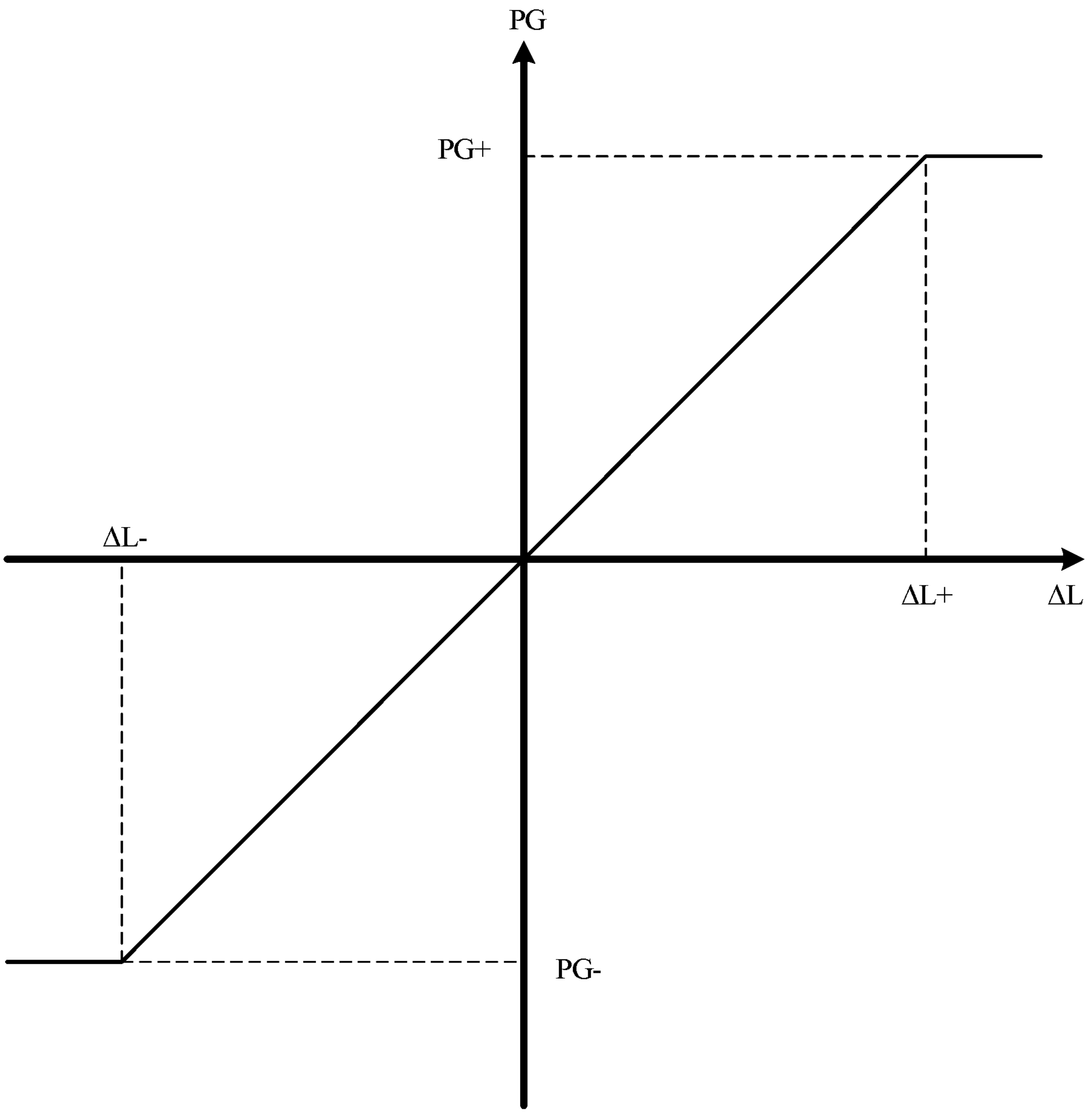
FIGS. 4A and 4B show respective exemplary level and phase differences vs. pinna gain curves for providing a (complex) postfilter gain reflecting acoustic characteristics of pinna versus a level and phase difference, respectively, between second and first electric input signals from respective second and first microphones located at an ear canal and at the but away from the ear canal, respectively.

FIG. 4A shows an exemplary level difference ($\Delta L$, e.g. [dB]) vs. pinna gain curve for providing a postfilter gain (PG) reflecting acoustic characteristics of pinna versus a level difference between second and first electric input signals from respective second and first microphones located at an ear canal and at the but away from the ear canal, respectively. As illustrated in FIG. 4A, the postfilter gain (PG, e.g. at a given frequency, representing the acoustic properties of pinna) may increase (and decrease) with increasing (decreasing) level difference measure (e.g. $\Delta L=L2-L1$). In the exemplary illustration in FIG. 4A, the postfilter gain (pinna gain, PG) is proportional to the level difference measure (e.g. $\Delta L=L2-L1$). The pinna gain (PG) may, as illustrated in FIG. 4A, be represented by a piecewise linear function. In the example of FIG. 4A, the pinna gain includes a cap (PG+, PG−) beyond which the gain does not increase (or decrease) further for increasing (or decreasing) level difference measure (e.g. $\Delta L=L2-L1$). The cap values (PG+, PG−) of the pinna gain correspond to positive and negative level differences ($\Delta L+$, $\Delta L-$), respectively. The exemplary pinna gain vs. level difference cure of FIG. 4A is symmetric with respect to the center of the coordinate system (0,0). This needs not be the case, however. It is expected that $\Delta L=L2-L1$ is generally more positive than negative. Negative values of the level difference may e.g. be translated to a lower (e.g. zero) pinna gain compared to a corresponding positive level difference. The pinna gain (PG)

may, however, be a smooth function of the level difference measure. Due to the location of the ITE microphone, its directional pattern will include many of the relevant pinna cues used for sound localization. If both first and second microphones are located near the ear canal, it will be difficult to further improve the pinna cues. If one of the microphones is located in the BTE device and the other microphone is located in the ITE device, the level difference can be used to introduce pinna cues in the BTE signal, hereby simulating ITE pinna cues while having the improved feedback path of the BTE device.

Figure 4B:
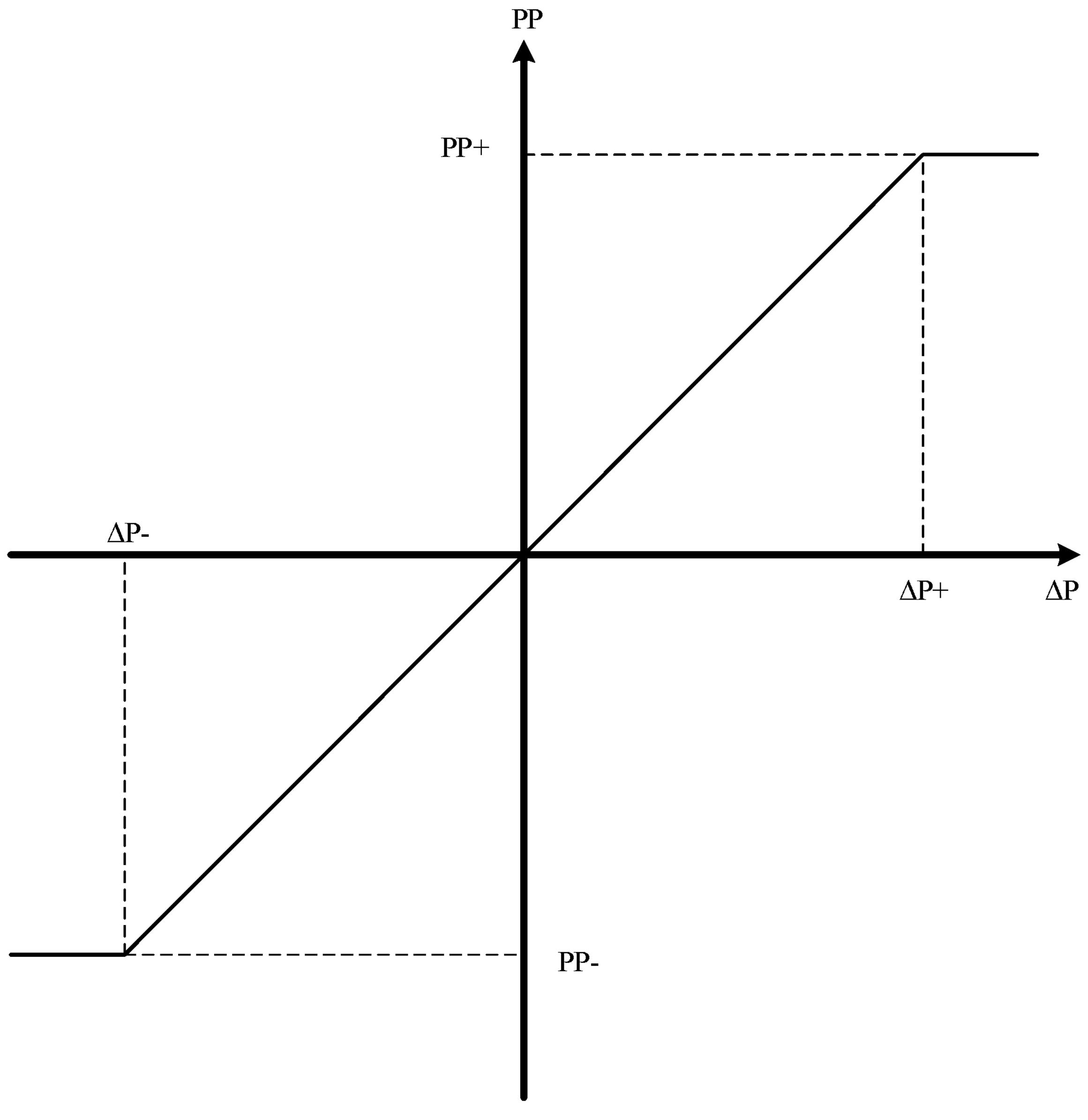

FIG. 4B shows an exemplary phase difference (ΔP, e.g. [radians]) vs. postfilter phase (PP) reflecting acoustic characteristics of pinna. The phase difference (PP) is a phase difference between second and first electric input signals from respective second and first microphones located at an ear canal and away from the ear canal, respectively. The exemplary functional relationship between the phase difference (ΔP) and the postfilter phase (PP) is similar to the functional relationship between level difference (ΔL) and postfilter gain (PG) in FIG. 4A. This need not be the case though. The phase difference (ΔP) is in the range of −180 to 180 degrees (or −π to π), whereas the level difference (ΔL) is in principle unlimited.

The acoustic characteristics represented by the complex valued postfilter output may be determined from a difference between the complex valued microphone signals (IN1, IN2). The resulting complex valued acoustic characteristics (AC) of the ear may be written $AC=|PG|e^{iPP}$, where PG and PP are the postfilter gain (magnitude) and phase, respectively.

When e.g. the first and second electric input signals are $IN1=|IN1|e^{iPhase(IN1)}$ and $IN2=|IN2|e^{iPhase(IN2)}$ the phase difference ΔP=Phase(IN1)−Phase(IN2) and the level difference ΔL=MAG(IN1)−MAG(IN2) in a logarithmic representation, or MAG(IN1)/MAG(IN2) in the linear-domain.

A pinna gain vs. level curve (or data representative thereof, e.g. an or functional expression may be stored in the hearing aid and be accessible to the audio signal processor, e.g. to the postfilter gain determination unit (PF-GC), cf. e.g. FIGS. 1D-1H, and 2A.

The pinna gain vs. level difference data may be (is expected to be) user (ear) dependent, and may preferably be customized for a given hearing aid (e.g. during a fitting session). Alternatively (or additionally) predetermined pinna gain vs. level difference data (e.g. measured on a model ear) may by stored in a memory of the hearing aid.

The 'pinna cues' are typically dominated by phase modifications of the acoustic signal impinging on the ear (pinna) at relatively low frequencies (below a LF-HF-threshold frequency, $f_{LF-HF}$) and are dominated by amplitude modifications at relatively high frequencies (above the LF-HF-threshold frequency, $f_{LF-HF}$). The border frequency between low and high frequencies may in the present context be larger than 1 kHz, e.g. in the range between 1 kHz and 4 kHz, e.g. around 2 kHz. The threshold frequency may be different for different persons (ears). The postfilter gains may be determined as described above (from a level difference measure (e.g. ΔL=L2−L1)) for frequencies above the LF-HF-threshold frequency ($f_{LF-HF}$) e.g. for frequencies above 1 kHz.

Similarly, the postfilter gains may be determined as a phase difference ΔP=P2−P1, below the LF-HF-threshold frequency ($f_{LF-HF}$).

Embodiments of the disclosure may e.g. be useful in applications such as sound localization in hearing aids.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP2262285A1 (Oticon) 15 Dec. 2010.
US20170295436A1 (Oticon A/S) 12 Oct. 2017.
EP3506658A1 (Oticon) 3 Jul. 2019.
[Roffler & Butler; 1968] Roffler, S. K., & Butler, R. A., "Factors that influence the localization of sound in the vertical plane", The Journal of the Acoustical Society of America, Vol. 43(6) (1968), pp. 1255-1259.

The invention claimed is:

1. A hearing aid configured to be worn at, and/or in, an ear of a user, the hearing aid comprising a forward path for processing sound from the environment of the user, the forward path comprising at least one first microphone providing at least one first electric input signal representing said sound as received at the respective at least one first microphones, said at least one first microphone being located away from a first ear canal of the user, an audio signal processor for processing said at least one first electric input signal, or a signal or signals originating therefrom, and for providing a processed signal, wherein the audio signal processor comprises a directional system for providing at least one beamformer comprising predefined and/or adaptively updated beamformer weights, and for providing at least one beamformed signal in dependence of said at least two first electric input signals and said at least one beamformer, and a postfilter for filtering said beamformed signal, or a signal originating therefrom, based on adaptively updated postfilter gains and configured to provide a filtered signal, an output transducer for providing stimuli perceivable as sound to the user in dependence of said processed signal, at least one second microphone connected to said audio signal processor, the at least one second microphone being configured to provide at least one second electric input signal representing said sound as received at the at least one second microphone, the at least one second microphone being located at or in said first ear canal of the user, the hearing aid being configured to operate in a mode of operation chosen from at least: a first mode of operation and a second mode of operation, the first mode of operation being a mode of high noise attenuation, the second mode being a mode of preservation of pinna cue, the selection of the first mode or the second mode being based on input from a movement sensor.

2. The hearing aid according to claim 1, wherein when the movement sensor indicates low movement activity, the first mode is selected, and when the movement sensor indicates high movement activity the second mode is selected.

3. The hearing aid according to claim 1, wherein the first mode of operation and the second mode of operation are active simultaneously and a ratio between the first mode of operation and the second mode of operation is selected based on the movement sensor.

4. A hearing aid according to claim 1 comprising a BTE-part adapted for being located at or behind an ear (pinna) of the user, and wherein the at least one first microphone is located in said BTE-part.

5. A hearing aid according to claim 1 comprising an ITE-part adapted for being located at or in an ear canal of the user, and wherein the at least one second microphone is located in said ITE-part.

6. A hearing aid according to claim 1 comprising a feedback control system for estimating and/or attenuating feedback from said output transducer to one or more of said at least one first microphones and said at least one second microphone and wherein the feedback control system is configured to provide a reliability estimate of the at least one second electric input signal in dependence of said feedback estimate.

7. A hearing aid configured to be worn at, and/or in, an ear of a user, the hearing aid comprising a forward path for processing sound from the environment of the user, the forward path comprising at least one first microphone providing at least one first electric input signal representing said sound as received at the respective at least one first microphones, said at least one first microphone being located away from a first ear canal of the user, an audio signal processor for processing said at least one first electric input signal, or a signal or signals originating therefrom, and for providing a processed signal, wherein the audio signal processor comprises a directional system for providing at least one beamformer comprising predefined and/or adaptively updated beamformer weights, and for providing at least one beamformed signal in dependence of said at least two first electric input signals and said at least one beamformer, and a postfilter for filtering said beamformed signal, or a signal originating therefrom, based on adaptively updated postfilter gains and configured to provide a filtered signal, an output transducer for providing stimuli perceivable as sound to the user in dependence of said processed signal, at least one second microphone connected to said audio signal processor, the at least one second microphone being configured to provide at least one second electric input signal representing said sound as received at the at least one second microphone, the at least one second microphone being located at or in said first ear canal of the user, the hearing aid being configured to operate in a mode of operation chosen from at least: a first mode of operation and a second mode of operation, the first mode of operation being a mode of high noise attenuation, the second mode being a mode of preservation of pinna cue, the selection of the first mode or the second mode being based on input from a voice activity detector.

8. The hearing aid according to claim 7, wherein when the voice activity detector indicates voice activity, the first mode is selected, and with the voice activity detector indicates no voice activity, the second mode is selected.

9. A hearing aid configured to be worn at, and/or in, an ear of a user, the hearing aid comprising a forward path for processing sound from the environment of the user, the forward path comprising at least one first microphone providing at least one first electric input signal representing said sound as received at the respective at least one first microphones, said at least one first microphone being located away from a first ear canal of the user, an audio signal processor for processing said at least one first electric input signal, or a signal or signals originating therefrom, and for providing a processed signal, wherein the audio signal processor comprises a directional system for providing at least one beamformer comprising predefined and/or adaptively updated beamformer weights, and for providing at least one beamformed signal in dependence of said at least two first electric input signals and said at least one beamformer, and a postfilter for filtering said beamformed signal, or a signal originating therefrom, based on adaptively updated postfilter gains and configured to provide a filtered signal, an output transducer for providing stimuli perceivable as sound to the user in dependence of said processed signal, at least one second microphone connected to said audio signal processor, the at least one second microphone being configured to provide at least one second electric input signal representing said sound as received at the at least one second microphone, the at least one second microphone being located at or in said first ear canal of the user, the hearing aid being configured to operate in a mode of operation chosen from at least: a first mode of operation and a second mode of operation, the first mode of operation being a mode of high noise attenuation, the second mode being a mode of preservation of pinna cue, the selection of the first mode or the second mode being based on determining noise level in environment, wherein when a high noise level is detected, the first mode of operation is selected, and when a low noise level is detected, the second mode of operation is selected.

* * * * *